US012755623B2

(12) United States Patent
Petrogiannis

(10) Patent No.: US 12,755,623 B2
(45) Date of Patent: Oct. 6, 2026

(54) METHOD, SOFTWARE AND DEVICE FOR IMPLEMENTING PERSONAL SAFETY FUNCTIONALITIES

(71) Applicant: RLP Industries, Montreal (CA)

(72) Inventor: Robin Petrogiannis, Montreal (CA)

( * ) Notice: Subject to any disclaimer, the term of this patent is extended or adjusted under 35 U.S.C. 154(b) by 63 days.

(21) Appl. No.: 18/905,384

(22) Filed: Oct. 3, 2024

(65) Prior Publication Data

US 2025/0384752 A1 Dec. 18, 2025

Related U.S. Application Data

(60) Provisional application No. 63/659,015, filed on Jun. 12, 2024.

(51) Int. Cl.
*G08B 21/02* (2006.01)
*G08B 3/10* (2006.01)
(Continued)

(52) U.S. Cl.
CPC .......... *G08B 21/02* (2013.01); *G08B 3/1016* (2013.01); *H04W 4/38* (2018.02); *G06V 20/52* (2022.01); *G10L 25/63* (2013.01)

(58) Field of Classification Search
CPC .... G06V 20/597; G06V 20/58; G06V 20/584; G06V 40/19; G06V 40/20; G06V 40/23; G06V 40/28; G06V 20/52; G06V 10/00; G06V 20/00; G06V 30/00; G06V 40/00; G06V 2201/00; G16H 10/40; G16H 20/30; G16H 40/67; G16H 50/20; G16H 40/63; G16H 15/00; G16H 20/10; G16H 20/40; G16H 20/60; G16H 40/20; G16H 50/30; G16H 50/70; G16H 70/40; Y02A 90/10; A61B 5/02055; A61B 5/021; A61B 5/024; A61B 5/0533; A61B 5/163; A61B 5/165; A61B 5/318; A61B 5/369; A61B 5/4561; A61B 5/4809; A61B 5/4845; A61B 5/0205; A61B 5/11; A61B 5/6804; A61B 5/681; A61B 5/6895; A61B 5/055; A61B 5/14532; A61B 5/1455; A61B 5/6805; A61B 5/747; A61B 1/00; A61B 3/00; A61B 5/00; A61B 6/00; A61B 7/00; A61B 8/00; A61B 9/00; A61B 13/00; A61B 10/00; A61B 16/00;
(Continued)

(56) References Cited

U.S. PATENT DOCUMENTS 11,676,291 B1 * 6/2023 Pandya .................. G06V 20/20 382/103
2018/0001185 A1 * 1/2018 Swanson .................. A63F 1/12
(Continued)

*Primary Examiner* — Daniel Previl

(57) ABSTRACT

The present specification provides a method for implementing personal safety functionalities. The method comprises collecting sensor data from at least one sensor of a device and executing by a processing unit of the device a safety risk prediction algorithm. The algorithm uses inputs comprising the sensor data to determine a safety risk indicator where the safety risk indicator is indicative of whether a user of the device is exposed to a safety risk presented by at least one person in the vicinity of the user of the device. The method further takes at least one action by the processing unit of the device when the indicator indicates that the user is exposed to a safety risk. The present also provides a safety device, and instructions to be executed by a processing unit.

20 Claims, 13 Drawing Sheets

(51) Int. Cl.
*H04W 4/38* (2018.01)
*G06V 20/52* (2022.01)
*G10L 25/63* (2013.01)

(58) Field of Classification Search
CPC ......... A61B 17/00; A61B 18/00; A61B 34/00; A61B 42/00; A61B 46/00; A61B 50/00; A61B 90/00; A61B 2217/00; A61B 2218/00; A61B 2503/00; A61B 2505/00; A61B 2560/00; A61B 2562/00; A61B 2576/00; B60K 2360/177; B60K 2360/191; B60K 2360/21; B60K 2360/5915; B60K 2360/77; B60K 35/10; B60K 35/23; B60K 35/28; B60K 35/285; B60K 35/29; B60K 35/60; B60K 35/85; B60Q 9/008; G06N 5/02; G06N 20/00; G06N 20/10; G06N 20/20; G06N 3/045; G06N 3/0464; G06N 3/084; G06N 3/09; G06N 5/01; G06N 5/04; G06N 7/01; G06N 7/023; G08G 1/005; G08G 1/0112; G08G 1/0133; G08G 1/16; G08G 1/166; H04W 4/38; H04W 4/027; H04W 84/18; H04W 4/00; H04W 8/00; H04W 12/00; H04W 16/00; H04W 24/00; H04W 28/00; H04W 36/00; H04W 40/00; H04W 48/00; H04W 52/00; H04W 56/00; H04W 60/00; H04W 64/00; H04W 68/00; H04W 74/00; H04W 72/00; H04W 76/00; H04W 80/00; H04W 84/00; H04W 88/00; H04W 92/00; H04W 99/00; A42B 3/0433; A42B 3/046; A42B 1/00; A42B 3/00; A42B 5/00; A42B 7/00; A63B 2071/1233; A63B 2071/125; A63B 2071/1283; A63B 21/072; A63B 21/0724; A63B 21/0726; A63B 2220/12; A63B 2220/13; A63B 2220/16; A63B 2220/20; A63B 2220/24; A63B 2220/30; A63B 2220/40; A63B 2220/51; A63B 2220/53; A63B 2220/56; A63B 2220/72; A63B 2220/74; A63B 2220/75; A63B 2220/76; A63B 2220/803; A63B 2220/806; A63B 2220/807; A63B 2220/833; A63B 2220/836; A63B 2225/30; A63B 2225/50; A63B 2225/54; A63B 2225/74; A63B 2230/06; A63B 2230/60; A63B 2230/70; A63B 2243/0025; A63B 2243/0037; A63B 2243/0054; A63B 2243/0066; A63B 2243/007; A63B 2243/0095; A63B 2244/102; A63B 2244/18; A63B 2244/19; A63B 2244/20; A63B 2244/203; A63B 43/004; A63B 60/46; A63B 69/0002; A63B 69/0026; A63B 69/0028; A63B 69/0048; A63B 69/0071; A63B 69/02; A63B 69/06; A63B 69/16; A63B 69/36; A63B 69/3632; A63B 69/38; A63B 71/06; A63B 71/085; A63B 71/10; A63B 71/1216; A63B 71/1291; A63B 71/141; A63B 71/145; A63F 13/211; B33Y 10/00; G01L 5/0052; G01N 2291/0258; G01N 2291/044; G01N 29/14; G01N 29/4436; G06F 1/163; G06F 16/2465; G06F 16/9024; G06F 2216/03; G06F 3/00; G06F 3/017; G06F 16/9538; G06F 16/9577; G06F 3/011; G06F 3/012; G06F 3/013; G06F 40/58; G06F 1/00; G06F 5/00; G06F 7/00; G06F 8/00; G06F 9/00; G06F 11/00; G06F 12/00; G06F 13/00; G06F 15/00; G06F 16/00; G06F 17/00; G06F 18/00; G06F 21/00; G06F 30/00; G06F 40/00; G06F 2101/00; G06F 2111/00; G06F 2113/00; G06F 2115/00; G06F 2117/00; G06F 2119/00; G06F 2123/00; G06F 2201/00; G06F 2200/00; G06F 2203/00; G06F 2205/00; G06F 2206/00; G06F 2207/00; G06F 2209/00; G06F 2211/00; G06F 2212/00; G06F 2213/00; G06Q 20/065; G06Q 20/308; G06Q 30/0206; G06Q 30/0201; G06Q 30/0251; G06Q 30/0282; G09B 19/003; G09B 19/0038; G08B 21/02; G08B 25/016; G08B 15/004; G08B 21/22; G08B 3/1016; G08B 31/00; G08B 6/00; G08B 1/00; G08B 3/00; G08B 5/00; G08B 7/00; G08B 9/00; G08B 13/00; G08B 15/00; G08B 17/00; G08B 19/00; G08B 21/00; G08B 23/00; G08B 25/00; G08B 27/00; G08B 26/00; G08B 29/00; F41H 1/00; F41H 3/00; F41H 5/00; F41H 7/00; F41H 11/00; F41H 9/00; F41H 13/00; G10L 17/26; G10L 25/63; G10L 13/00; G10L 15/00; G10L 17/00; G10L 19/00; G10L 21/00; G10L 25/00; G10L 99/00; H04B 1/04; H04L 67/10; H04N 23/57; H04N 7/18; H04Q 2209/40; H04Q 9/00; A61M 2005/14513; A61M 2205/0283; A61M 2205/0294; A61M 2205/18; A61M 2205/3317; A61M 2205/3331; A61M 2205/3523; A61M 2205/50; A61M 2205/8206; A61M 2205/8243; A61M 2230/20; A61M 2250/00; A61M 5/14276; A61M 5/14526; A61M 5/16804; A61M 5/172; G01R 33/4808; G01R 33/5608; G01R 35/005; G02B 2027/0138; G02B 27/017; G06T 19/006; G06T 19/20; G06T 2207/30252; G06T 2207/30268; G06T 7/70
USPC ............ 340/539.22, 539.26, 539.13, 539.32, 340/545.3, 552, 565, 568.1, 571, 686.6, 340/691.6, 692
See application file for complete search history.

(56) References Cited

U.S. PATENT DOCUMENTS

| | | | | |
|---|---|---|---|---|
| 2023/0106673 A1* | 4/2023 | Asghar ................ | G06V 20/584 382/104 |
| 2023/0339395 A1* | 10/2023 | Haynes .................. | B60Q 9/008 |
| 2024/0071112 A1* | 2/2024 | Suto ......................... | G06N 3/09 |

* cited by examiner

METHOD, SOFTWARE AND DEVICE FOR IMPLEMENTING PERSONAL SAFETY FUNCTIONALITIES

TECHNICAL FIELD

The present disclosure relates to the field of personal safety solutions. More specifically, the present disclosure presents a method, software and device for implementing personal safety functionalities.

BACKGROUND

Various types of personal safety situations may occur, where the safety of a person is put at risk. The present disclosure focuses on situations where a first person is in the vicinity of a second person (e.g. at a distance of less than a few meters) and the second person presents a risk for the safety of the first person. Such a situation may occur in various circumstances, including dating, use of public transportation, interactions with an unknown person (e.g. responding to a question from the unknown person), interactions with family member(s), etc. Furthermore, such a situation may occur in various locations, including in a street, in a public transportation infrastructure (e.g. in the metro), in a commercial building (e.g. in a shopping center), in a condominium building, at a place of work, at home, etc.

A variety of personal safety devices have been designed, to implement personal safety features. These devices generally have a small form factor and can be discreetly carried by a person. The devices have embedded electronic components for implementing the personal safety features.

However, some of the existing personal safety devices rely on a user interaction with the device for detecting a situation presenting safety risks, which is a limiting factor in some circumstances. For example, a high level of stress may prevent the person at risk from performing the user interaction with the device. Other existing safety devices have the capability to detect a situation presenting safety risks (with little to no user interaction with the device), but the detection capabilities may be limited in terms of versatility, reliability, etc. Furthermore, it may be considered preferable by some users to integrate the personal safety functionalities to a device already carried by the person (e.g. a watch, a smartphone, etc.), rather than carrying a dedicated personal safety device.

There is therefore a need for a new method, software and device for implementing personal safety functionalities.

SUMMARY

According to a first aspect, the present disclosure relates to a method for implementing personal safety functionalities. The method comprises collecting sensor data from at least one sensor of a device and executing by a processing unit of the device a safety risk prediction algorithm. The algorithm uses inputs comprising the sensor data to determine a safety risk indicator. The safety risk indicator is indicative of whether a user of the device is exposed to a safety risk presented by at least one person in the vicinity of the user of the device. The method further comprises taking at least one action by the processing unit of the device when the indicator indicates that the user is exposed to a safety risk.

In a particular aspect, the sensor data comprise at least one of the following: visual behavioral changes of the at least one person extracted from images generated by an imaging sensor of the device, voice pattern changes of the at least one person extracted from sounds recorded by a sound sensor of the device, heart rate measurements of the user generated by a heart rate sensor of the device, and blood pressure measurements of the user generated by a blood pressure sensor of the device.

In another particular aspect, the inputs further comprise at least one of the following: contextual data collected by the device and additional data received from a server implementing server-side personal safety functionalities.

In another particular aspect, the action is at least one of the following: configurable and personalized based on contextual data collected by the device.

In yet another particular aspect, the at least one action comprise at least one of the following: warning the user of the exposition to a safety risk through an interaction of the device with the user, generating a deterring sound sequence by a speaker of the device to deter the at least one person, sending an alert via a wireless communication interface of the device to a server in charge of forwarding the alert to one or more contact devices, and directly sending the alert via the wireless communication interface of the device to the one or more contact devices.

In another particular aspect, the device is one of the following: a smartphone, a smart watch or a smart bangle.

In yet another particular aspect, the algorithm is a machine learning algorithm using a predictive model for determining the safety risk indicator based on the inputs.

In another aspect, the processing unit of the device determines a ranking and a localization of a plurality of contacts of the user, the ranking of each contact being based on at least one data element associated to the contact, the at least one data element associated to the contact comprising at least one of the following: a trust relationship of the contact, a response capacity of the contact, a proximity of the contact and a response history of the contact.

In another aspect, a map based on the ranking and localization of the plurality of contacts of the user is displayed on a screen of the device.

In yet another aspect, determining the ranking of the plurality of contacts of the user comprises calculating each ranking by the device based on data received from a server or receiving each ranking from the server.

According to a second aspect, the present disclosure relates to a non-transitory computer readable medium comprising instructions executable by a processing unit of a device. The execution of the instructions by the processing unit of the device provides for implementing personal safety functionalities by implementing the aforementioned method.

According to a third aspect, the present disclosure relates to a safety device. The safety device comprises a wireless communication interface, at least one sensor and a processing unit. The processing unit collects sensor data from the at least one sensor, executes a safety risk prediction algorithm, and takes at least one action when the indicator indicates that the user is exposed to a safety risk. The algorithm uses inputs comprising the sensor data to determine a safety risk indicator, the safety risk indicator being indicative of whether a user of the safety device is exposed to a safety risk presented by at least one person in the vicinity of the user of the device.

In a particular aspect, the sensor data comprise at least one of the following: visual behavioral changes of the at least one person extracted from images generated by an imaging sensor of the safety device, voice pattern changes of the at least one person extracted from sounds recorded by a sound sensor of the safety device, heart rate measurements of the user generated by a heart rate sensor of the safety device, and blood pressure measurements of the user generated by a blood pressure sensor of the device.

In another particular aspect, the inputs further comprise at least one of the following: contextual data collected by the device and additional data received from a server implementing server-side personal safety functionalities.

In yet another aspect, the at least one action comprise at least one of the following: warning the user of the exposition to a safety risk through an interaction of the safety device with the user, generating a deterring sound sequence by a speaker of the safety device to deter the at least one person, sending an alert via the wireless communication interface to a server in charge of forwarding the alert to one or more contact devices, and directly sending the alert via the wireless communication interface to the one or more contact devices.

In another aspect, the processing unit of the device determines a ranking and a localization of a plurality of contacts of the user, the ranking of each contact being based on at least one data element associated to the contact, the at least one data element associated to the contact comprising at least one of the following: a trust relationship of the contact, a response capacity of the contact, a proximity of the contact and a response history of the contact.

In yet another aspect, a map based on the ranking and localization of the plurality of contacts of the user is displayed on a screen of the device.

In another aspect, determining the ranking of the plurality of contacts of the user comprises calculating each ranking by the device based on data received from a server or receiving each ranking from the server.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address the needs of providing a personal safety solution to a person meeting another person (or several other persons) in a potentially risky context (e.g. during a date, in a workspace environment, etc.), to a person being attacked unprovoked, etc. Throughout the present specification, the expression personal safety solution applies and encompasses safety risk mitigation, safety risk prevention and safety risk avoidance. More specifically, the present disclosure describes a personal safety solution comprising a personal safety device carried by a user and executing a client-side personal safety software. The personal safety device is either a dedicated device (only carried for safety purposes) or a generic device (e.g. a smartphone) executing the client-side personal safety software. A server executing a server-side personal safety software is also described. The server is capable of interacting with a plurality of personal safety devices. Optionally, the server only interacts with the client-side personal safety software during an initial phase, after which the client-side personal safety software is capable of operating independently of the server.

Figure 1:
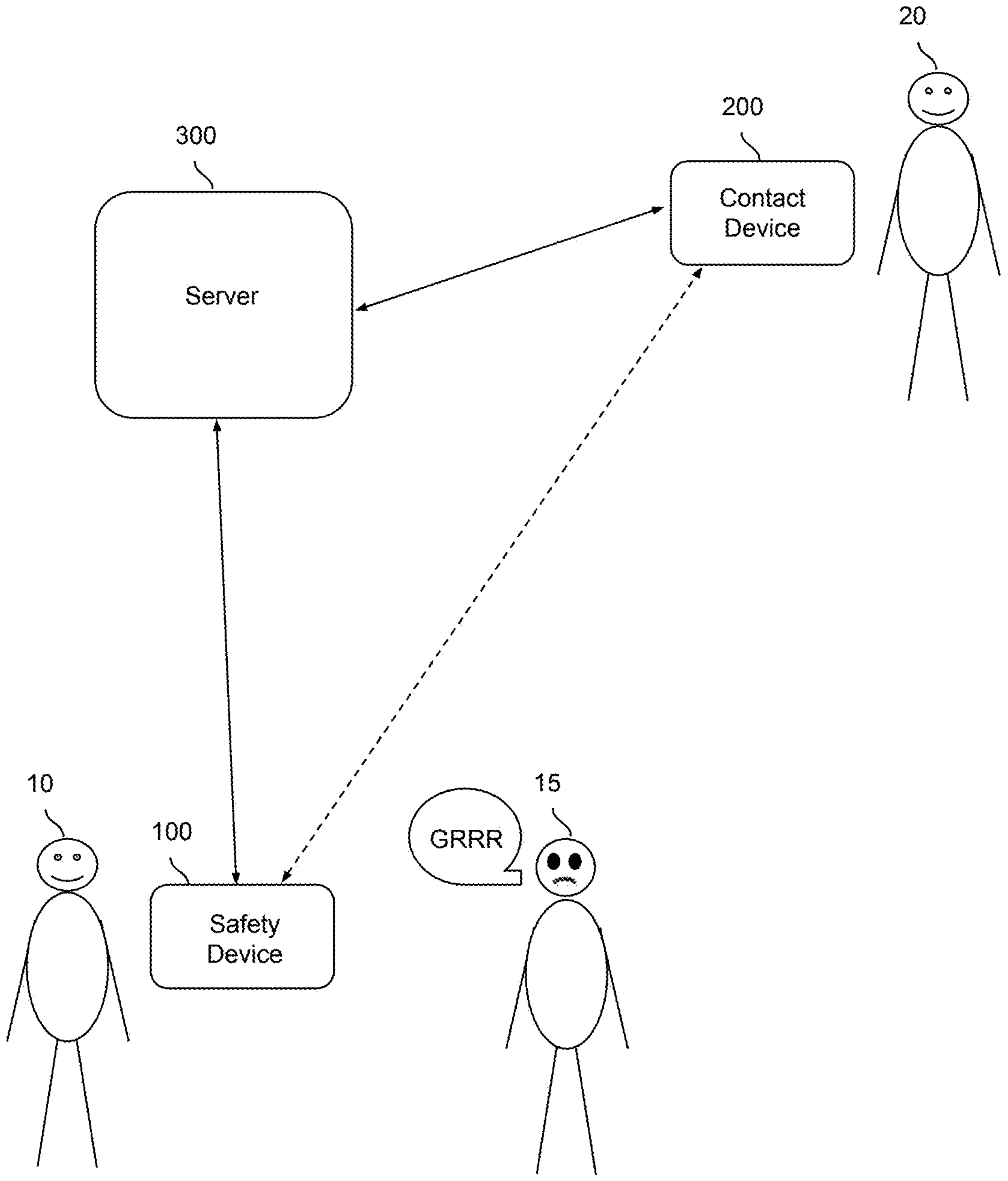
FIG. 1 represents a personal safety situation involving a user of a safety device.

Reference is now made to FIG. 1, which represents a personal safety situation involving a user 10 carrying a safety device 100. The user 10 is in the vicinity (e.g. within a range of less than a few meters) of a person 15 potentially presenting a safety risk for the user 10. Although a single person 15 is represented in FIG. 1 for simplification purposes, the present disclosure is also applicable to several persons 15 potentially presenting a safety risk for the user 10.

The safety device 100 exchanges data with a server 300 adapted to interact with a plurality of safety devices 100 carried by a plurality of users 10. The server 300 also exchanges data with a contact device 200 of a contact person 20. In the rest of the description, the contact person 20 will be referred to as a contact. For each user 10, the server 300 is adapted to interact with one or more contact devices 200 of corresponding respective contact(s) 20 defined for the user 10. A single contact 20 is illustrated in FIG. 1 for simplification purposes only.

In a particular implementation, the safety device 100 may further be capable of collecting data and analyzing the collected data to determine whether the one or more persons 15 present or not a safety risk to the user 10. Upon determination that a safety risk exists, the safety device 100 takes at least one of the following actions: warning the user 10 of the exposition to a safety risk and/or taking an action to deter the person(s) 15, sending an alert to the server 300 (indicative of the existence of the safety risk) so that the server 300 forwards the alert to contact device(s) 200 of the contact 20, and directly sending an alert to the contact device 200 of the contact 20.

The safety device 100 and the server 300 implement additional functionalities which will be described in the rest of the description.

Figure 2:
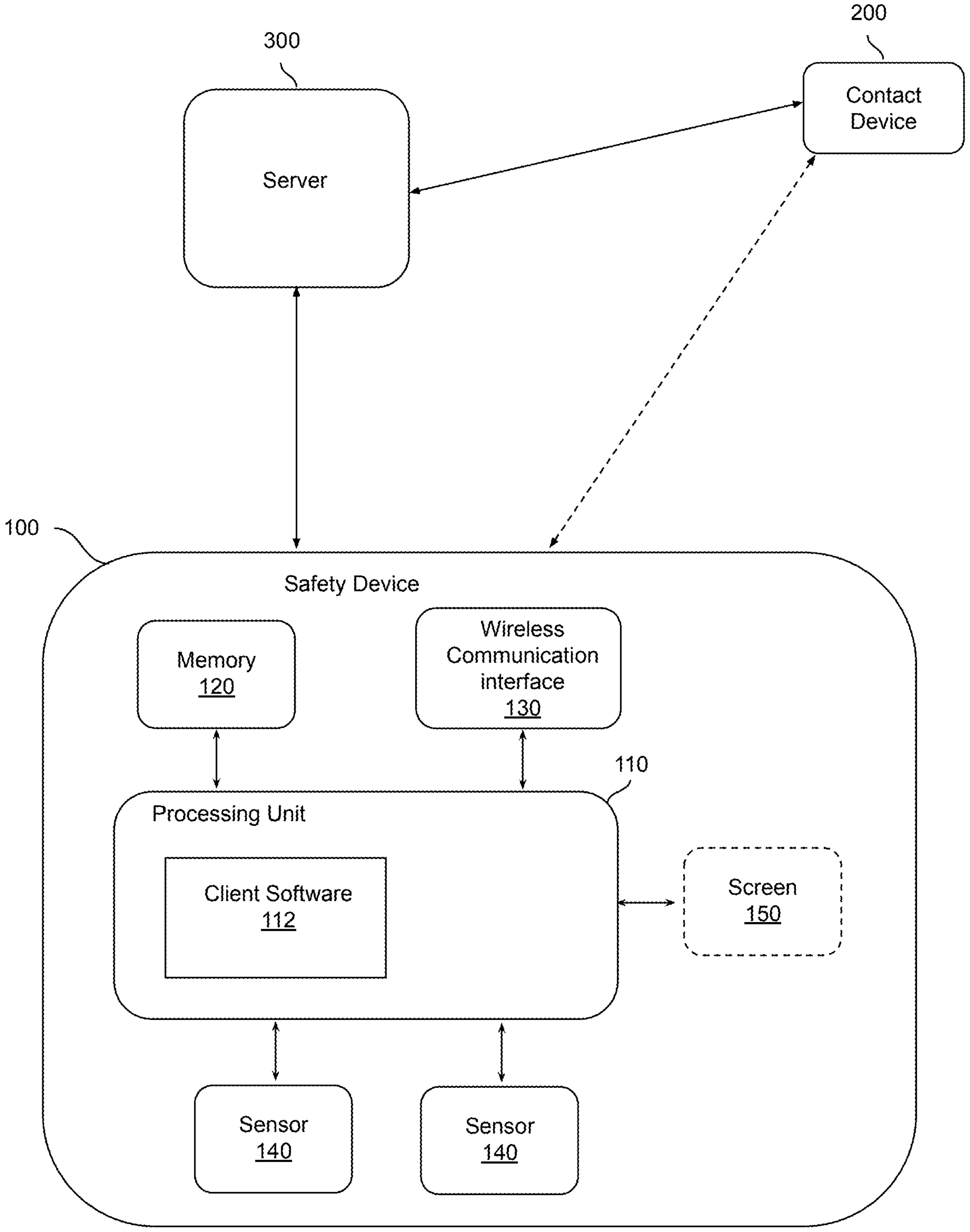
FIG. 2 is a functional representation of components of the safety device illustrated in FIG. 1.

Reference is now made concurrently to FIGS. 1 and 2, where FIG. 2 is a functional representation of components of the safety device 100. Examples of safety devices 100 include a smart watch, a smartphone, a smart bangle, etc. The terminology smart refers to a device (e.g. watch, bangle) with components supporting the functionalities of the safety device 100, as described in the following paragraphs.

The safety device 100 comprises a processing unit 110, memory 120, a wireless communication interface 130, and one or more sensors 140 (two sensors are represented in FIG. 2 for illustration purposes only). The safety device 100 may comprise additional components, such as a screen 150.

The processing unit 110 comprises one or more processors (not represented in FIG. 2) capable of executing instructions of a computer program. Each processor may further comprise one or several cores. The processing unit 110 executes a client software 112 supporting personal safety functionalities, as will be detailed later in the description. The client software 112 shall be interpreted broadly, as a single computer program implementing all the personal safety functionalities, or as a plurality of computer programs respectively implementing one or more of the personal safety functionalities.

The memory 120 stores instructions of computer program(s) executed by the processing unit 110 (for implementing the client software 112, etc.), data generated by the execution of the computer program(s), data received via the wireless communication interface 130, etc. Only a single memory 120 is represented in FIG. 2, but the safety device 100 may comprise several types of memories, including volatile memory (such as a volatile Random Access Memory (RAM), etc.) and non-volatile memory (such as electrically erasable programmable read-only memory (EEPROM), flash, etc.).

The wireless communication interface 130 allows the safety device 100 to exchange data with other devices (e.g. the server 300, optionally the contact device 200, etc.) over a communication network (not represented in FIG. 2 for simplification purposes). For example, the wireless communication interface 130 is a cellular interface, allowing the safety device 100 to directly exchange data with the other devices. In another example, the wireless communication interface 130 is a Bluetooth® or Bluetooth® Low Energy (BLE) interface, allowing the safety device 100 (e.g. a smart watch or a smart bangle) to exchange data with the other devices through an intermediate device (e.g. through a smartphone). In this case, the intermediate device (e.g. smartphone) communicates with the safety device 100 using at least one of Bluetooth or BLE, Wi-Fi, etc.; and communicates with the other devices (e.g. server 300) using for example a cellular network. The wireless communication interface 130 usually comprises a combination of hardware and software executed by the hardware, for implementing the communication functionalities of the communication interface 130.

The safety device 100 may also support different types of wireless communication interfaces 130 (e.g. a cellular interface and at least one of a Bluetooth, BLE, or Wi-Fi interface) for exchanging data with the other devices. This is for example the case for a safety device 100 implemented by a smartphone, and potentially also by a smart watch with a SIM card.

Based on the type of communication interface(s) 130 supported, the safety device 100 (e.g. in the case of a smartphone or a smart watch with a SIM card) has the capability to independently exchange data with the other devices. Alternatively, the safety device 100 (e.g. in the case of a bangle or a smartwatch without a SIM card) needs an intermediate device (e.g. a smartphone) to exchange data with the other devices.

The term sensor is used broadly in the present description, as any component capable of generating data representative of the user 10 (physical state, psychological state, biological state, etc.), data representative of the person 20, data representative of the environment in which the user 10 is located, etc. Examples of sensors 140 include a gyroscope, a global positioning system (GPS), a heart rate sensor, a blood pressure sensor, an infrared (IR) sensor, a visible imaging sensor (e.g. a Red, GREEN, BLUE (RGB) camera), a sound sensor (e.g. a microphone), etc. Any combination of sensors adapted to be embedded in the safety device 100 is considered relevant to the present disclosure. A precise description of each type of sensor is out of the scope of the present disclosure, since each of the aforementioned sensors is well known in the art.

Figure 3:
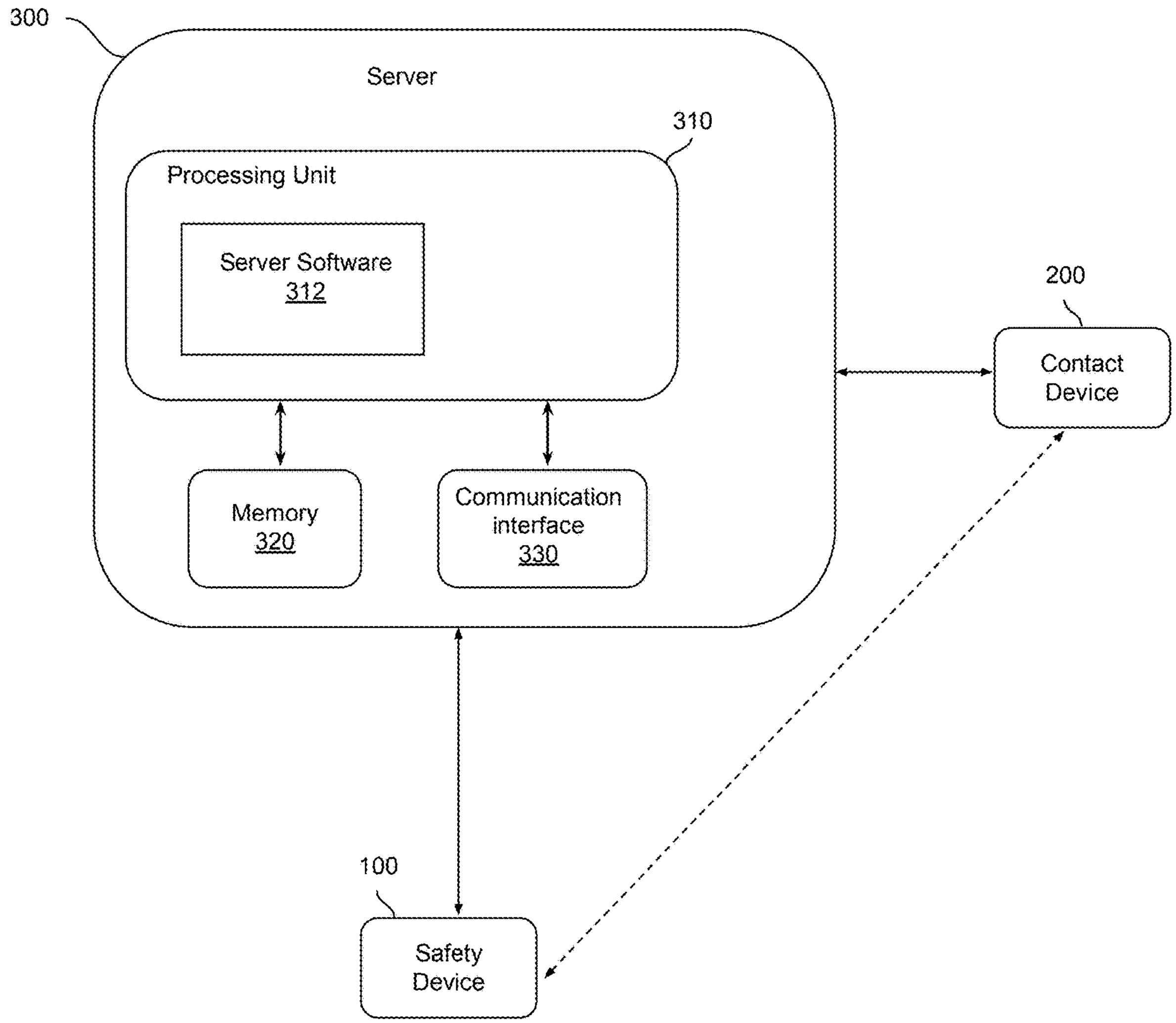
FIG. 3 is a functional representation of components of the server illustrated in FIG. 1.

Reference is now made concurrently to FIGS. 1 and 3, where FIG. 3 is a functional representation of components of the server 300. The server 300 can be implemented by any computing device with enough processing capabilities to support interactions with a plurality of safety devices 100 and contact devices 200.

The server 300 comprises a processing unit 310, memory 320 and at least one communication interface 330. The server 300 may comprise additional components not represented in FIG. 3.

The characteristics of the processing unit 310 are similar to the characteristics of the processing unit 110 described previously in relation to FIG. 2. The processing unit 310 executes a server software 312 supporting personal safety functionalities, as will be detailed later in the description. As mentioned previously, the server software 312 shall be interpreted broadly, as a single computer program implementing all the personal safety functionalities, or as a plurality of computer programs respectively implementing one or more of the personal safety functionalities.

The characteristics of the memory 320 are similar to the characteristics of the memory 120 described previously in relation to FIG. 2. However, additional types of memory can be included in the server 300, such as a hard drive, etc.

The communication interface 330 allows the server 300 to exchange data with the safety devices 100 and the contact devices 200 over a communication network (not represented in FIG. 3 for simplification purposes). For example, the communication network is a wired communication network, such as an Ethernet network; and the communication interface 330 is adapted to support communication protocols used to exchange data over the Ethernet network. Other types of wired communication networks may also be supported by the communication interface 330. In another example, the communication network is a wireless communication network, such as a Wi-Fi network; and the communication interface 330 is adapted to support communication protocols used to exchange data over the Wi-Fi network. Other types of wireless communication network may also be supported by the communication interface 330, such as a cellular network, etc. More than one communication interface 330 may be included in the server 300 for exchanging data with other devices. Each communication interface 330 usually comprises a combination of hardware and software executed by the hardware, for implementing the communication functionalities of the communication interface 330.

Figure 4:
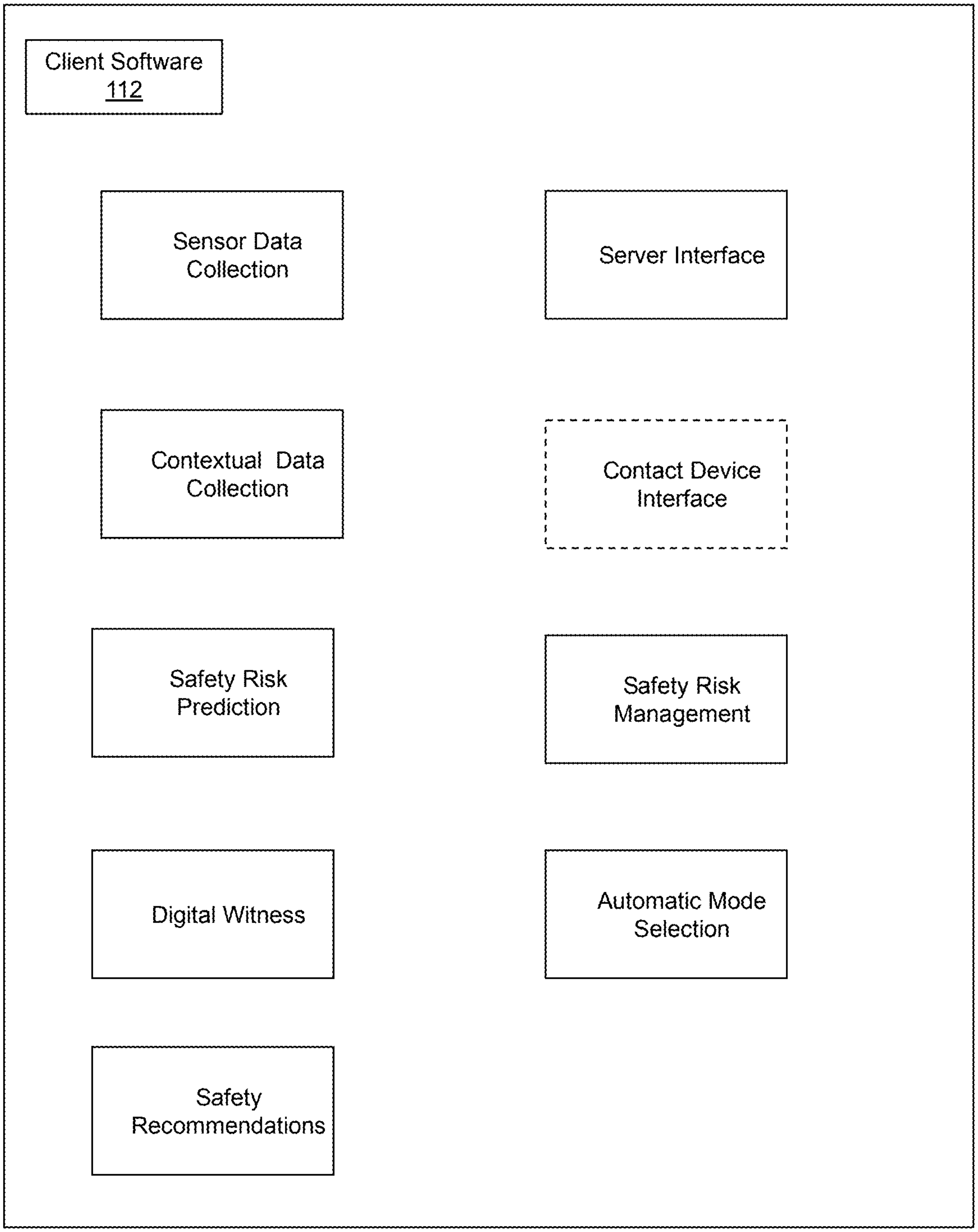
FIG. 4 represents functionalities implemented by the client software illustrated in FIG. 2.

Reference is now made concurrently to FIGS. 1, 2 and 4, where FIG. 4 represents functionalities implemented by the client software 112. Each functionality illustrated in FIG. 4 is implemented by a single software program or several software programs interacting with each other. Alternatively, at least some of the functionalities are implemented through the same software program(s).

The client software 112 comprises a sensor data collection functionality. This functionality collects the data generated by the sensor(s) 140 and optionally performs a pre-processing (e.g. sub-sampling, averaging, elimination of incoherent data, allocation of a timestamp, execution of a dedicated pre-processing algorithm, etc.) of the collected sensor data. The processing unit 110 is electrically/electronically connected to the sensor(s) 140 to allow the collection of the sensor data. More details about the collected sensor data will be provided when describing the functionalities implementing personal safety features.

The client software 112 comprises a contextual data collection functionality. This functionality collects contextual data providing safety and/or general purpose information with respect to the environment in which the user 10 is located. Examples of contextual data include crime rates, police reports, population densities, population demographics, etc. The granularity of each type of contextual data is variable, including for example country level, province level, city level, city neighborhood level, street level, etc. Other examples of contextual data include time data (e.g. day and time of day), data defining activity habits of the user 10 (e.g. planning of school attendance, planning of work attendance, scheduled date, etc.), daily experiences of the user 10, behavioral data of the user 10, etc.

The contextual data are received via the wireless communication interface 130 from one or more sources (e.g web sites, data feeds, alerts, etc.). Alternatively, some of the contextual data are determined directly by the client software 112. Optionally, some of the contextual data are pre-processed, before storage in the memory 120 and usage by other functionalities of the client software 112. The contextual data collection functionality is optional. When this functionality is present, it enriches (provides context to) the data collected via the sensor data collection functionality.

The client software 112 comprises a server interface functionality. This functionality supports the exchange of data with the server 300 through the wireless communication interface 130. This functionality establishes and maintains a connection with the server 300. When another functionality of the client software 112 generates data for the server 300, the server interface functionality performs the effective transfer of the data to the server 300. When data are received from the server 300, the server interface functionality forwards the received data to another functionality in charge of processing the received data. More details about the data exchanged with the server 300 will be provided when describing the functionalities implementing personal safety features.

The client software 112 optionally comprises a contact device interface functionality. This functionality supports the exchange of data with the contact device 200 through the wireless communication interface 130. If this functionality is not present, the safety device 100 does not communicate directly with the contact device 200, but only through the server 300. The contact device interface operates in a manner similar to the previously described server interface functionality, the counterpart being the contact device 200 instead of the server 300.

The client software 112 comprises a safety risk prediction functionality. This functionality implements an algorithm to determine a safety risk indicator (indicative of whether the user 10 is exposed to a safety risk presented by the person(s) 15) based on inputs. The inputs include sensor data collected from the sensor(s) 140. Optionally, the inputs include additional data, such as data transmitted by the server 300, contextual data collected by the contextual data collection functionality, etc. The safety risk indicator may take several forms, such as a Boolean indicating whether or not there is a safety risk, a percentage of chances that there is a safety risk (e.g. 95% of chances that there is a safety risk), etc. The algorithm is either a traditional algorithm (deterministic, e.g. based on rules applied to the inputs) or a machine learning algorithm. Details of how machine learning is used to implement this functionality will be provided later in the description.

Following are examples of the types of sensor data used as inputs (either individually or in any combination thereof): visual behavioral changes of the person(s) 15 extracted from images generated by the imaging sensor (infrared imaging sensor or visible imaging sensor), voice pattern changes of the person(s) 15 extracted from sounds recorded by the sound sensor, heart rate measurements generated by the heart rate sensor, blood pressure measurements generated by the blood pressure sensor, etc.

Examples of contextual data which are optionally used as inputs (either individually or in any combination thereof) have been detailed previously when describing the contextual data collection functionality (e.g. behavioral data of the user 10, daily experiences of the user 10, safety information with respect to the environment in which the user 10 is located, etc.).

The client software 112 comprises a safety risk management functionality. This functionality takes action(s) upon detection by the safety risk prediction functionality that the one or more persons 15 present a safety risk to the user 10.

Following are examples of the types of actions taken (either individually or in any combination thereof) to respond to a safety risk: warn the user 10 of the safety risk through an interaction of the safety device 100 with the user 10 (e.g. through a haptic feedback generated by a haptic component of the safety device 100, through a warning sound sequence generated by a speaker of the safety device 100, etc.), generate a deterring sound sequence (to deter the person(s) 15) by the speaker of the safety device 100, send an alert to the server 300, send an alert to the contact device 200, etc.

If the safety device 100 is a smartwatch or a smart bangle not adapted to generate haptic feedback or a sequence of sounds, the safety device 100 may interact through the wireless communication interface 130 with a smartphone carried by the user 10, to instruct the smartphone to generate the haptic feedback or the sequence of sounds.

The sending of an alert to the server 300 is performed through the server interface functionality. The alert generally includes a localization of the user 10 (e.g. generated by the GPS of the safety device 100). Additional information may be included in the alert. The processing of the alert by the server 300 will be described later in the description.

The sending of an alert to the contact device 200 is performed through the contact device interface functionality. As mentioned previously, the alert generally includes a localization of the user 10 and optionally additional information. The processing of the alert by the contact device 200 comprises notifying (e.g. through a visual and/or sound notification) the contact person 20 that the user 10 is in a situation presenting a safety risk, providing a localization of the user 10 (e.g. on a map displayed on a screen of the contact device 200), etc. Optionally, the alert is sent to a plurality of contact devices 200 of respective corresponding contacts 20. The contact device(s) 200 to which the alert is sent is/are pre-configured on the safety device 100. Alternatively, the contact device(s) 200 to which the alert is sent is/are provided by the server 300 and regularly updated based on a determination by the server 300 of which contact(s) 20 are currently available for effectively responding to the alert.

Optionally, the actions taken by this functionality are configurable and/or personalizable. For instance, In the case of configurable actions, a configuration file defining which actions shall be taken upon detection of a safety risk, is stored in the memory 120 of the safety device 100. The configuration file is generated, transmitted and updated by the server 300. Alternatively or complementarily, the configuration file is generated and updated by the user 10 (through a user interaction of the user 10 with the safety device 100). For example, the configuration file of a first safety device 100 triggers the following response to a safety risk: generating a haptic feedback, generating a deterring sound sequence, and sending an alert to a contact device 200. In another example, the configuration file of a second safety device 100 triggers the following response to a safety risk: generating a warning sound sequence and sending an alert to a contact device 200.

In the case of personalizable actions, the actions to be taken upon detection of a safety risk are personalized for each user 10. For instance, the personalization is based on at least some of the data collected by the contextual data collection functionality. Examples of contextual data used for personalizing the actions to be taken include a crime rate of the neighborhood where the user 10 is currently located, a population density of the neighborhood where the user 10 is currently located, a day and time of day, a current activity of the user 10 (e.g. attending school, attending work, dating, etc.), etc.

The client software 112 comprises a digital witness functionality. This functionality comprises two features.

A first feature consists of executing a digital witness software. The digital witness software records data related to the environment of the user 10 over a period of time. Examples of recorded data include (either individually or in any combination thereof) the following: a sequence of images or a video generated by the visible imaging sensor, a sequence of sounds recorded by the sound sensor, a sequence of localizations of the safety device 100 generated by the GPS, a timestamp associated to the recorded data (e.g. the beginning of the period of time during which the digital witness software is executed), etc.

A second feature consists in determining when to activate the digital witness software. In a first implementation, the activation is triggered by an interaction of the user 10 with the safety device 100. Ideally, the interaction should be discrete, for example through a pre-defined gesture of the user 10 which can be detected and recognized by the safety device 100. In a second implementation, the activation is performed automatically via an algorithm which determines whether the digital witness software needs to be activated based on inputs.

The inputs include sensor data collected from the sensor(s) 140. Optionally, the inputs include additional data, such as data transmitted by the server 300, contextual data collected by the contextual data collection functionality, etc. The algorithm is either a traditional algorithm (deterministic, e.g. based on rules applied to the inputs) or a machine learning algorithm.

This functionality is complementary to the safety risk prediction and safety risk management functionalities. Upon occurrence of a situation leading to a safety risk for the user 10, data are recorded by the digital witness functionality potentially before the risky situation occurred, at least during and potentially after the risky situation occurred. The recorded data can be used as proof by the user 10, can be analyzed to determine the respective actions of the user 10 and the person(s) 15 in the occurrence of a conflictual situation, etc.

The client software 112 comprises an automatic mode selection functionality. This functionality implements an algorithm to automatically select a mode of operation of the safety device 100 among a predefined list of modes based on inputs. For example, the pre-defined list of modes of operation comprises at least some of the following: date mode, transit mode, home mode, school mode, work mode, travel mode, etc.

An exemplary usage of the mode of operation consists in, based on the currently selected mode of operation, activating or not the functionality for predicting safety risk (e.g. not activated for home, school and work; activated for date, transit and travel).

Another exemplary usage of the mode of operation consists in, based on the currently selected mode of operation, determining which data are collected and used as inputs of the algorithm determining the safety risk indicator.

Another exemplary feature of the automatic mode selection functionality is controlling a frequency of collection of the data used by the client software 112 (e.g. data collected by the sensor data collection functionality, data collected by the contextual data collection functionality, etc.). For example, several modes varying from a low frequency data collection (e.g. every minute or more) to a high frequency data collection (e.g. every second or less) are defined. The mode currently enforced is determined based on one or more of the following parameters: risk level predicted by the safety risk prediction functionality, risk level perceived by the user 10 (communicated through a user interaction of the user 10 with the safety device 100), etc. A low risk level (predicted or perceived) results in a low frequency data collection, while a high risk level (predicted or perceived) results in a high frequency data collection.

The inputs of the automatic mode selection algorithm include sensor data collected from the sensor(s) 140, contextual data collected by the contextual data collection functionality, optionally data transmitted by the server 300, etc. The algorithm is either a traditional algorithm (deterministic, e.g. based on rules applied to the inputs) or a machine learning algorithm.

Following are examples of the types of sensor data used as inputs (either individually or in any combination thereof): biometric data (e.g. heat rate changes, blood pressure changes, tone of voice changes, other biometric data representative of stress and anxiety) of the user 10, localization data of the user 10 (e.g. generated by the GPS of the safety device 100), etc.

Examples of contextual data used as inputs (either individually or in any combination) have been provided in the description of the contextual data collection functionality.

The client software 112 comprises a safety recommendations functionality. This functionality provides recommendations towards risk avoidance to the user 10, encouragements/guidance towards safety conduct by the user 10, etc. The information generated by this functionality can be displayed on the screen 150 of the safety device 100, communicated via a speaker of the safety device 100, etc. Alternatively, the information is transferred to a linked device (e.g. a smartphone, a smart watch, etc.) and communicated to the user 10 via the linked device. The safety recommendations functionality uses contextual data collected by the contextual data collection functionality to generate the recommendations, encouragements, guidance, etc. The information generated by the safety recommendations functionality can be generic and applicable to all users 10, tailored to each user 10 by taking into account contextual data specific to each user, etc. Optionally, other sources of information are used as inputs of the safety recommendations functionality. For example, best practices in terms of risk avoidance and safety conducts are generated and transmitted by the server 300 based on the processing and analysis of data collected from multiple safety devices 100). In another example, the safety risk indicator generated by the safety risk prediction functionality is used as an input for the safety recommendations functionality.

Figure 5:
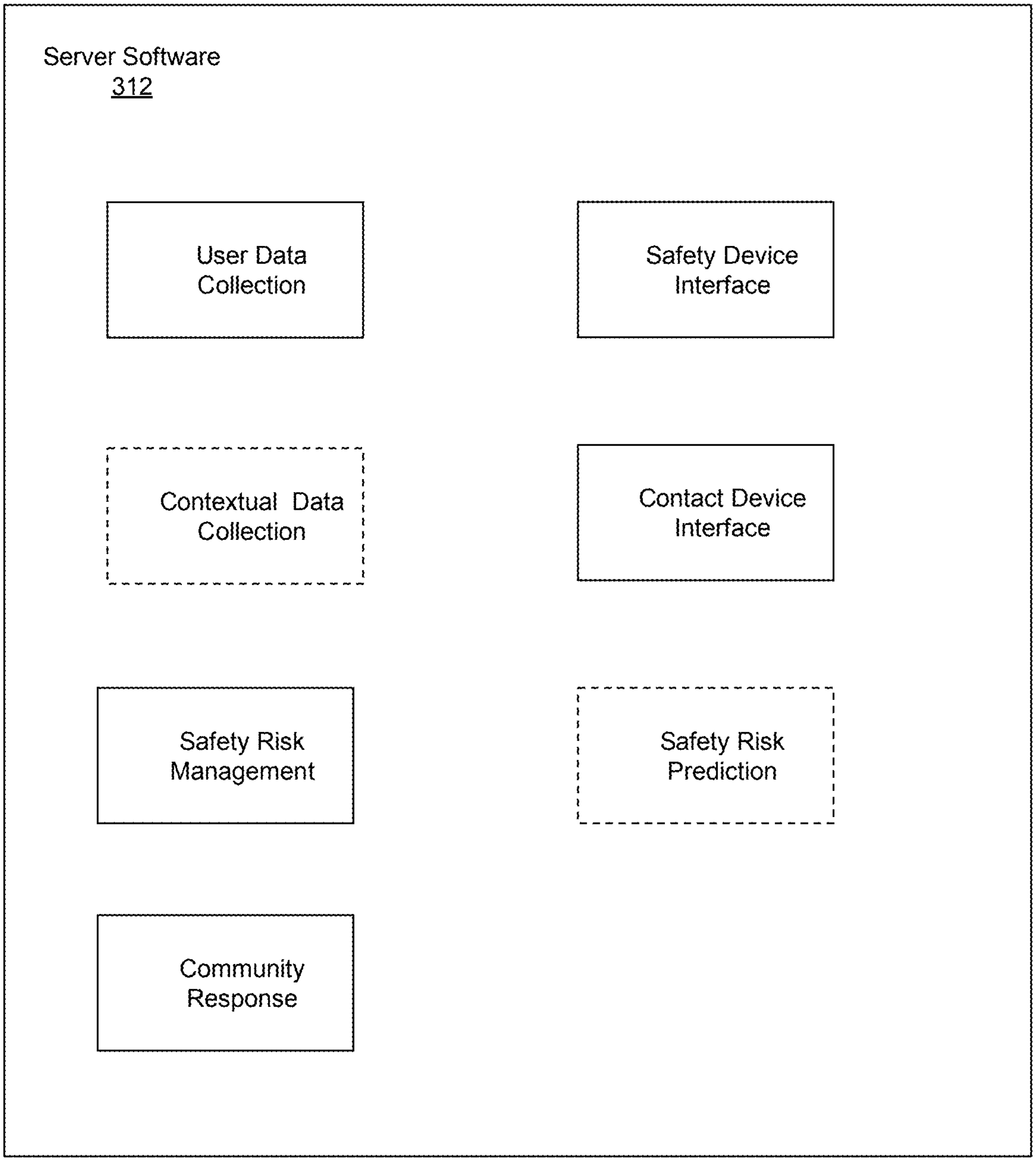
FIG. 5 represents functionalities implemented by the server software illustrated in FIG. 3.

Reference is now made concurrently to FIGS. 1, 3 and 5, where FIG. 5 represents functionalities implemented by the server software 312. Each functionality illustrated in FIG. 5 is implemented by a single software program or several software programs interacting with each other. Alternatively, at least some of the functionalities are implemented through the same software program(s).

The server software 312 comprises a safety device interface functionality. This functionality supports the exchange of data with the safety device 100 through the communication interface 330. This functionality is the counterpart of the server interface functionality illustrated in FIG. 4. When another functionality of the server software 312 generates data for the safety device 100, the safety device interface functionality performs the effective transfer of the data to the safety 100. When data are received from the safety device 100, the safety device interface functionality forwards the received data to another functionality in charge of processing the received data.

The server software 312 comprises a contact device interface functionality. This functionality supports the exchange of data with the contact device 200 through the communication interface 330. The contact device interface operates in a manner similar to the previously described safety device interface functionality, the counterpart being the contact device 200 instead of the safety device 100.

The server software 312 comprises a user data collection functionality. The data collected by this functionality are used by other functionalities of the server software 312, which will be detailed later in the description.

This functionality collects data related to the user 10, which are transmitted by the safety device 100 and received via the safety device interface functionality. One example of collected data includes a localization of the safety device 100 (e.g. GPS coordinates), which is updated regularly to keep track of the current position of the user 10. Another example comprises contextual data, which have been described previously in relation to FIG. 4.

This functionality also collects data related to the one or more contacts 20 of the user 10, which are transmitted by the respective corresponding one or more contact devices 200 and received via the contact device interface functionality. One example of collected data includes a localization of the contact device(s) 200 (e.g. GPS coordinates), which is updated regularly to keep track of the current position(s) of the contact(s) 20. Another example of collected data includes a status indicating an availability and/or willingness to respond (or not) to the detection of a safety risk for the user 10. The status is provided by the contact device(s) 200 of the contact(s) 20 of the user 10, and an update is transmitted each time the status changes.

This functionality optionally performs a pre-processing (e.g. sub-sampling, averaging, elimination of incoherent data, allocation of a timestamp, execution of a dedicated pre-processing algorithm, etc.) of the collected user data.

The server software 312 comprises a safety risk management functionality. This functionality takes action(s) upon reception of an alert (that a safety risk has been detected for the user 10) from the safety device 100. The alert is received through the safety device interface functionality. The alert generally includes a localization of the user 10 (e.g. generated by the GPS of the safety device 100), and optionally additional information.

This functionality determines one or more contact device(s) 200 to which the alert is transmitted through the contact device interface functionality. The transmission of the alert and the processing of the alert by the contact device(s) 200 has been described previously in relation to FIG. 4.

In a first implementation, the contact device(s) 200 to which the alert is transmitted are pre-configured. For example, one or more contacts 20 have been registered in the server 300 as being the contact(s) of the user 10. The alert is simply transmitted to the contact devices(s) 200 of all the registered contact(s) 20.

In a second implementation, the contact device(s) 200 to which the alert is transmitted are selected among a list of candidate contacts 20. For example, the list of candidate contacts 20 consists of the contacts 20 registered in the server 300 as being the contact(s) of the user 10.

An algorithm is used for performing the selection. Examples of inputs of the algorithm include (without limitations): the current localization of the user 10, the previously mentioned status indicating an availability and/or willingness to respond (or not) to the detection of the safety risk for each candidate contact 20, the current localization of each candidate contact 20, a weighting associated to each candidate contact 20 (e.g. a weighting representative of a level of trust), etc. The algorithm is either a traditional algorithm (deterministic, e.g. based on rules applied to the inputs) or a machine learning algorithm.

For example, the algorithm implements a predictive functionality to determine how much time it will take for each candidate contact 20 to provide support (e.g. go to the current location of the user 10). The selection (of whom to alert) among the candidate contacts 20 is based at least on this predictive functionality. The predictive functionality takes into consideration the respective localizations of the user 10 and candidate contacts 20, and optionally additional third-party data (e.g. status of the traffic in the streets and/or in public transportation, weather conditions, scheduled public event, etc.).

Optionally, as described previously in relation to the safety risk management functionality illustrated in FIG. 4, the actions taken by this functionality are configurable and/or personalizable.

The server software 312 optionally comprises a safety risk prediction functionality. For example, this functionality is implemented on the server 300 when the safety device 100 does not have the capabilities (e.g. processing power, memory capacity, etc.) to implement the functionality. The algorithm implemented by this functionality, to determine a safety risk indicator based on inputs, is similar to the algorithm that was described previously in relation to FIG. 4. In this case, the sensor data used as inputs of the algorithm are collected by the safety device 100 and transmitted to the server 300. At the server 300, the sensor data are considered as user data from the user 10, which are received, stored and optionally pre-processed by the user data collection functionality. The safety risk indicator generated by the safety risk prediction functionality is directly processed by the safety risk management functionality implemented by the server software 312. To support this implementation, the server software 312 optionally comprises a contextual data collection functionality, similar to the one illustrated in FIG. 4. As mentioned previously, the collected contextual data are optionally used as inputs of the algorithm.

The server software 312 comprises a predictive community response functionality. This functionality processes data collected from the contacts 20 and optionally from the user 10 (by the user data collection functionality) to determine metrics and/or characteristics of the contacts 20. Examples of characteristics include (without limitations) the sex of each contact 20, a relationship of each contact 20 with the user 10 (e.g. partner, family, friend, colleague, secondary contact, etc.), etc. Examples of metrics include (without limitations) a level of trust, etc. For example, the level of trust of a contact 20 is calculated based on a number of connections of the contact 20 with other individuals (e.g. the other contacts 20 of the user 10). In another example, the level of trust of a contact 20 is calculated based on the average time it takes for the contact 20 to respond to a safety alert (based on a history of the responses of the contact 20).

In a first exemplary implementation, some of the characteristics and/or metrics of each contact 20 are used by the safety risk management functionality, to determine the contact(s) 20 to whom an alert shall be sent when a prediction of a safety risk for the user 10 has occurred.

In another exemplary implementation, the predictive community response functionality uses some of the characteristics and/or metrics of each contact 20 to provide the user 10 with a view into the near future of who can come to their aid, in how long, and in what capacity.

The characteristics and/or metrics of each contact 20 are transmitted to the safety device 10, optionally with a current localization of each contact 20. The characteristics and/or metrics are displayed on the screen 150 of the safety device 10. If the current localization of each contact 20 is provided, the position of each contact 20 with respect to the user 10 can be represented on a predictive community responder map (PCRM), using colors (or other visual effects) to represent a given characteristic or metric for each contact 20. If the safety device 20 does not have a screen, the information that needs to be displayed is transferred to a linked device (e.g. a smartphone, a smart watch, etc.) and displayed on a screen of the linked device.

The user 10 can use the displayed information to access a situation: if a safety risk occurs, am I confident that I will receive some help and in a reasonable delay. More specifically, the PCRM allows the user 10 to see who (singular and plural) is available in their trust and capacity network to respond, and in what period of time, in order to provide the user 10 with real time data to decide if they want to proceed with their current activity or abandon.

The PCRM is generated by taking into consideration multiple data elements determined for the contacts 20, including (but not limited to) at least one of the following:

(i) Trust relationship: trust relationship of a given contact 20 with the user 10 and optionally with other contacts 20. The contacts 20 are ranked based on a trust level (the higher the trust level, the higher the rank) by a response algorithm used for determining who should be contacted in case of occurrence of a situation presenting a safety risk.

(ii) Response capacity: contacts 20 who are more capable of dealing with aggressive scenarios (e.g. they have self-defense training, etc.) are also ranked higher by the response algorithm used for determining who should be contacted in case of occurrence of a situation presenting a safety risk.

(iii) Proximity: an estimation is made for each contact 20 of the time needed for the contact 20 to get to the place where the user 10 is located. Contacts 20 are ranked based on the estimation of the time needed (the lower the time needed, the higher the rank) by the response algorithm used for determining who should be contacted in case of occurrence of a situation presenting a safety risk.

(iv) Response history: a determination is made of how many times each contact 20 has come to someone's aid (number of rescue interventions) within a predicted time window. Contacts 20 are ranked based on the number of rescue interventions (the higher the number of rescue interventions, the higher the rank) by the response algorithm used for determining who should be contacted in case of occurrence of a situation presenting a safety risk.

The response algorithm takes into consideration the rankings of each contact 20 with respect to one or more data elements (e.g. trust relationship, response capacity, proximity, response history, etc.) to generate a global ranking for each contact 20. Weights can be used to give more or less importance to each criterion to calculate the global ranking.

The response algorithm further displays the PCRM on a screen (e.g. screen 150 of the safety device 100) based on the geolocation and the global ranking of each contact 20 (e.g. using color codes to identify the contacts 20 by order of global ranking).

The response algorithm is one of: a standard algorithm, a machine learning algorithm which has been trained to infer the global ranking based on the previously mentioned data elements, etc.

In a first exemplary implementation, the response algorithm is executed by the server 300, based on previously mentioned data elements collected by the server 300. The global ranking and geolocation of each contact 20 are determined by the server 300 and transmitted to the safety device 100. The safety device 100 displays the corresponding PRCM (or another visual representation) on the screen 150 of the safety device 100 (or the screen of a linked device).

In a second exemplary implementation, the response algorithm is executed by the safety device 100. The previously mentioned data elements and geolocation of each contact 20 are transmitted by the server 300 to the safety device 100.

The user 10 can also use the displayed information to select one or more contact(s) 20 to whom an alert shall be sent in case of prediction of a safety risk for the user 10. The selection can be used directly by the client-side safety risk management functionality and/or transmitted to the server 300 for use by the server-side safety risk management functionality.

Figure 6:
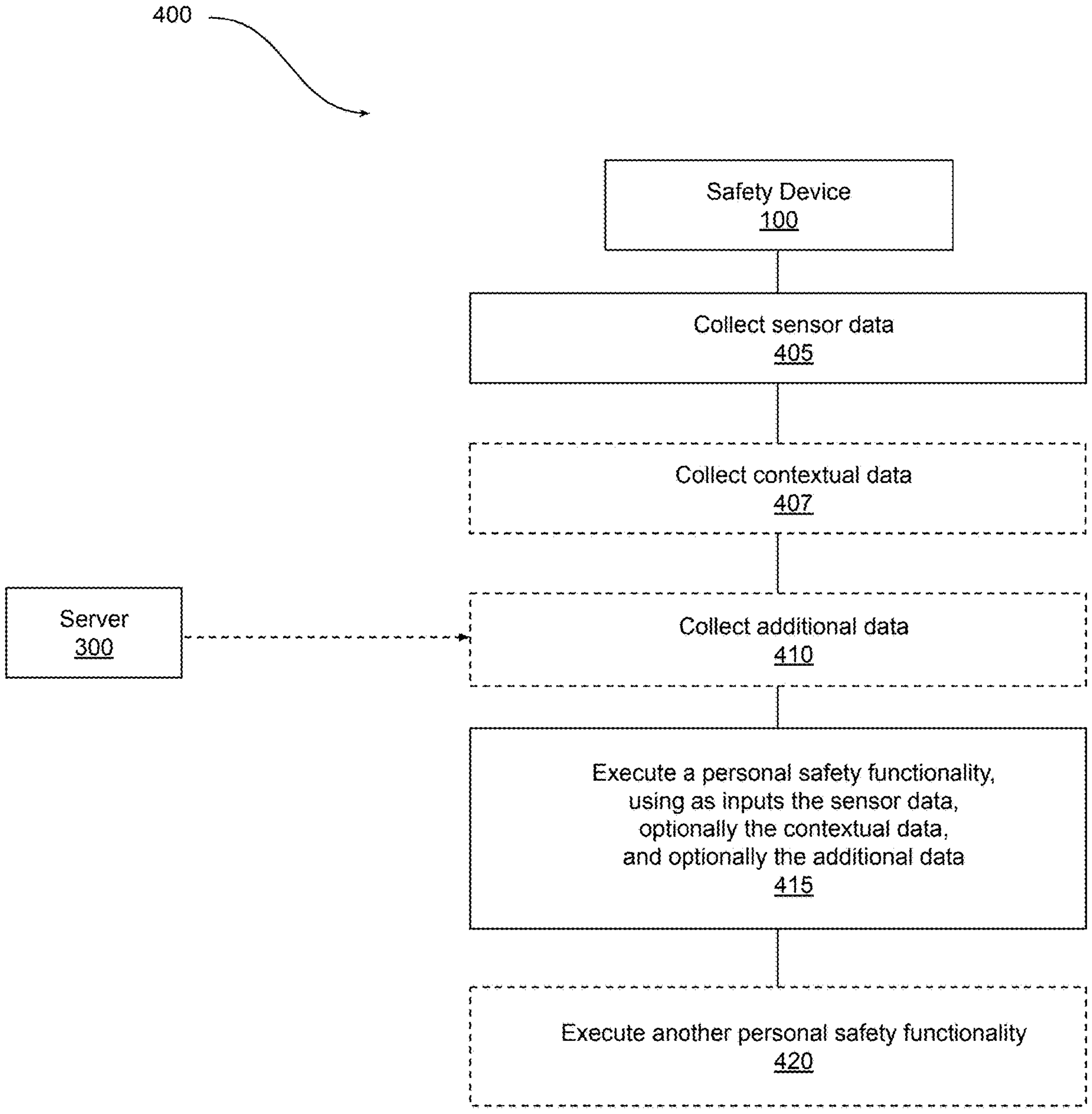
FIG. 6 represents a method for implementing personal safety functionalities performed by the safety device illustrated in FIGS. 1 and 2.

Reference is now made concurrently to FIGS. 1, 2 and 6, where FIG. 6 represents a method 400 for implementing personal safety functionalities performed by the safety device 100.

One or more dedicated computer program(s) have instructions for implementing at least some of the steps of the method 400. The instructions are comprised in a non-transitory computer readable medium (e.g. the memory 120) of the safety device 100. The instructions provide for implementing personal safety functionalities, when executed by the processing unit 110 of the safety device 100. The instructions are deliverable to the safety device 100 via an electronically readable media such as a storage media (e.g. USB key, etc.), or via communication links (e.g. via a communication network through the wireless communication interface 130).

The method 400 comprises the step 405 of collecting sensor data from at least one sensor 140 of the safety device 100. Step 405 is performed by the processing unit 110 of the safety device 100. This step has been described previously in relation to the sensor data collection functionality illustrated in FIG. 4.

The method 400 comprises the optional step 407 of collecting contextual data. Step 407 is performed by the processing unit 110 of the safety device 100. This step has also been described previously in relation to the contextual data collection functionality illustrated in FIG. 4.

The method 400 comprises the optional step 410 of collecting additional data from the server 300. Step 410 is performed by the processing unit 110 of the safety device 100. This step has also been described previously in relation to FIG. 4.

The method 400 comprises the step 415 of executing a personal safety functionality, which uses as inputs the sensor data collected at step 405, optionally the contextual data collected at step 407, and optionally the additional data collected at step 410. Step 415 is performed by the processing unit 110 of the safety device 100. Examples of personal safety functionalities include the safety risk prediction, the automatic mode selection and the digital witness, which have been described previously in relation to FIG. 4.

The method 400 comprises the optional step 420 executing another personal safety functionality. Step 420 is performed by the processing unit 110 of the safety device 100. The execution of the other personal safety functionality is dependent on the execution of step 415.

For example, if the functionality consisting of predicting the safety risk is performed at step 415, then the functionality consisting of managing the safety risk (described previously in relation to FIG. 4) is performed at step 420 if a safety risk is detected.

In another example, if the functionality consisting of automatic mode selection is performed at step 415, then the functionality consisting of predicting the safety risk is performed or not at step 420 depending on the mode selected at step 415.

Figure 7:
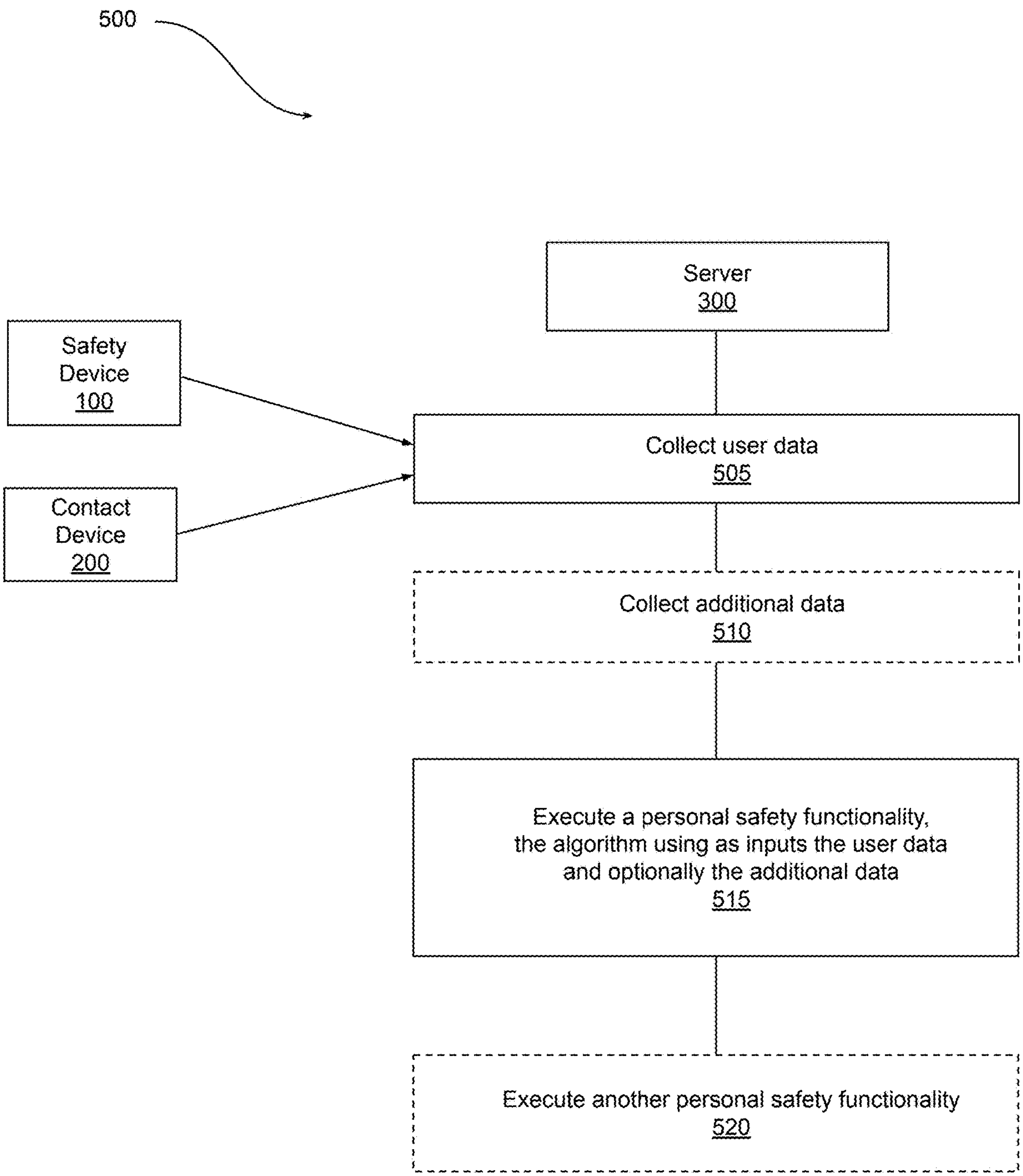
FIG. 7 represents a method for implementing personal safety functionalities performed by the server illustrated in FIGS. 1 and 3.

Reference is now made concurrently to FIGS. 1, 3 and 7, where FIG. 7 represents a method 500 for implementing personal safety functionalities performed by the server 300.

One or more dedicated computer program(s) have instructions for implementing at least some of the steps of the method 500. The instructions are comprised in a non-transitory computer readable medium (e.g. the memory 320) of the server 300. The instructions provide for implementing personal safety functionalities, when executed by the processing unit 310 of the server 300. The instructions are deliverable to the server 300 via an electronically readable media such as a storage media (e.g. USB key, etc.), or via communication links (e.g. via a communication network through the communication interface 330).

The method 500 comprises the step 505 of collecting user data. Step 505 is performed by the processing unit 310 of the server 300. The user data are collected from at least one of the safety devices 100 and/or contact device(s) 200. This step has been described previously in relation to the user data collection functionality illustrated in FIG. 5.

The method 500 comprises the optional step 510 of collecting additional data. Step 510 is performed by the processing unit 310 of the server 300. Examples of additional data have been described previously in relation to FIG. 5, and include for example contextual data collected by the contextual data collection functionality of the server 300.

The method 500 comprises the step 515 of executing a personal safety functionality, which uses as inputs the user data collected at step 505 and optionally the additional data collected at step 510. Step 515 is performed by the processing unit 310 of the server 300. Examples of personal safety functionalities include the safety risk management, the predictive community response and optionally the safety risk prediction, which have been described previously in relation to FIG. 5.

The method 500 comprises the optional step 520 of executing another personal safety functionality. Step 520 is performed by the processing unit 310 of the server 300. The execution of the other personal safety functionality is dependent on the execution of step 515.

For example, if the functionality consisting of predicting the safety risk is performed at step 515, then the functionality consisting of managing the safety risk is performed at step 520 if a safety risk is detected.

Reference is now made concurrently to FIGS. 4, 5, 6, 7, 8, 9, 10 and 11, where FIGS. 8-11 represent different use cases for executing the safety risk prediction functionality and the safety risk management functionality.

Figure 8:
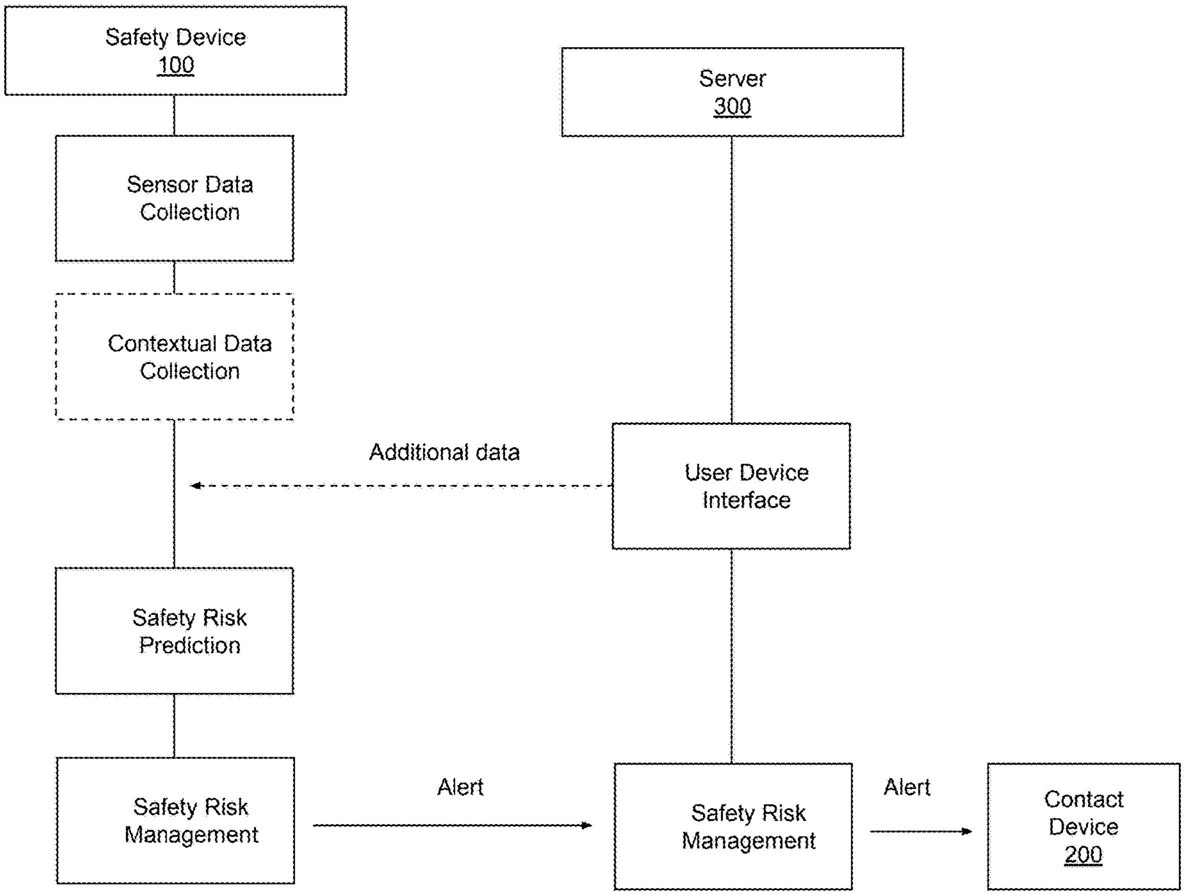
FIGS. 8, 9, 10 and 11 represent different use cases for executing the safety risk prediction functionality and the safety risk management functionality illustrated in FIGS. 4 and 5.

FIG. 8 illustrates a first use case where the safety device 100 executes the safety risk prediction functionality (step 415 of the method 400). If a safety risk is detected, the safety device 100 executes the client-side safety risk management functionality (step 420 of the method 400), which comprises sending an alert to the server 300.

The server 300 executes the server-side safety risk management functionality (step 515 of the method 500), which comprises sending an alert to one or more contact devices 200 (selected via the algorithm implemented by the server-side safety risk management functionality).

Figure 9:
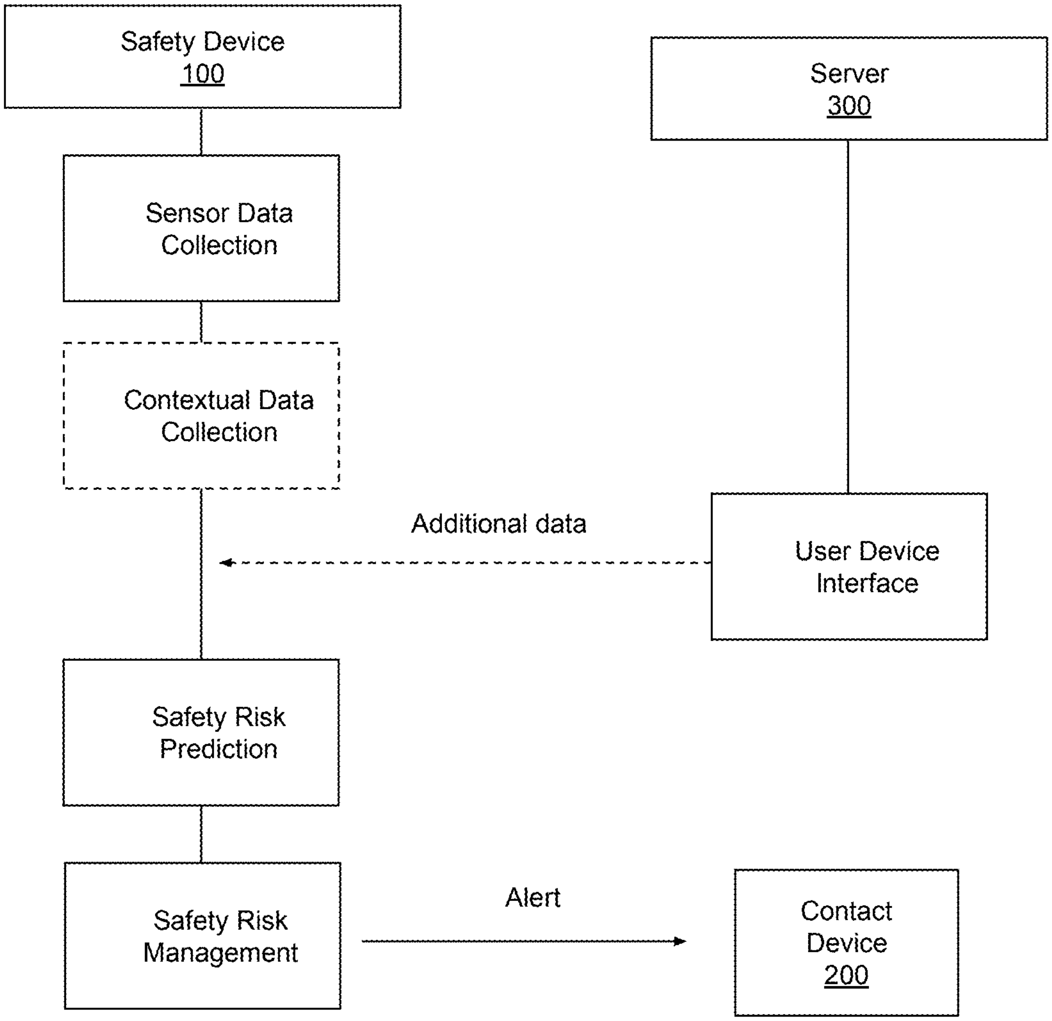

FIG. 9 illustrates a second use case where the safety device 100 executes the safety risk prediction functionality (step 415 of the method 400). If a safety risk is detected, the safety device 100 executes the client-side safety risk management functionality (step 420 of the method 400), which comprises directly sending an alert to one or more contact devices 200. As mentioned previously, the one or more contact devices 200 are either pre-defined or determined dynamically (and transmitted) by the server 300.

Figure 10:
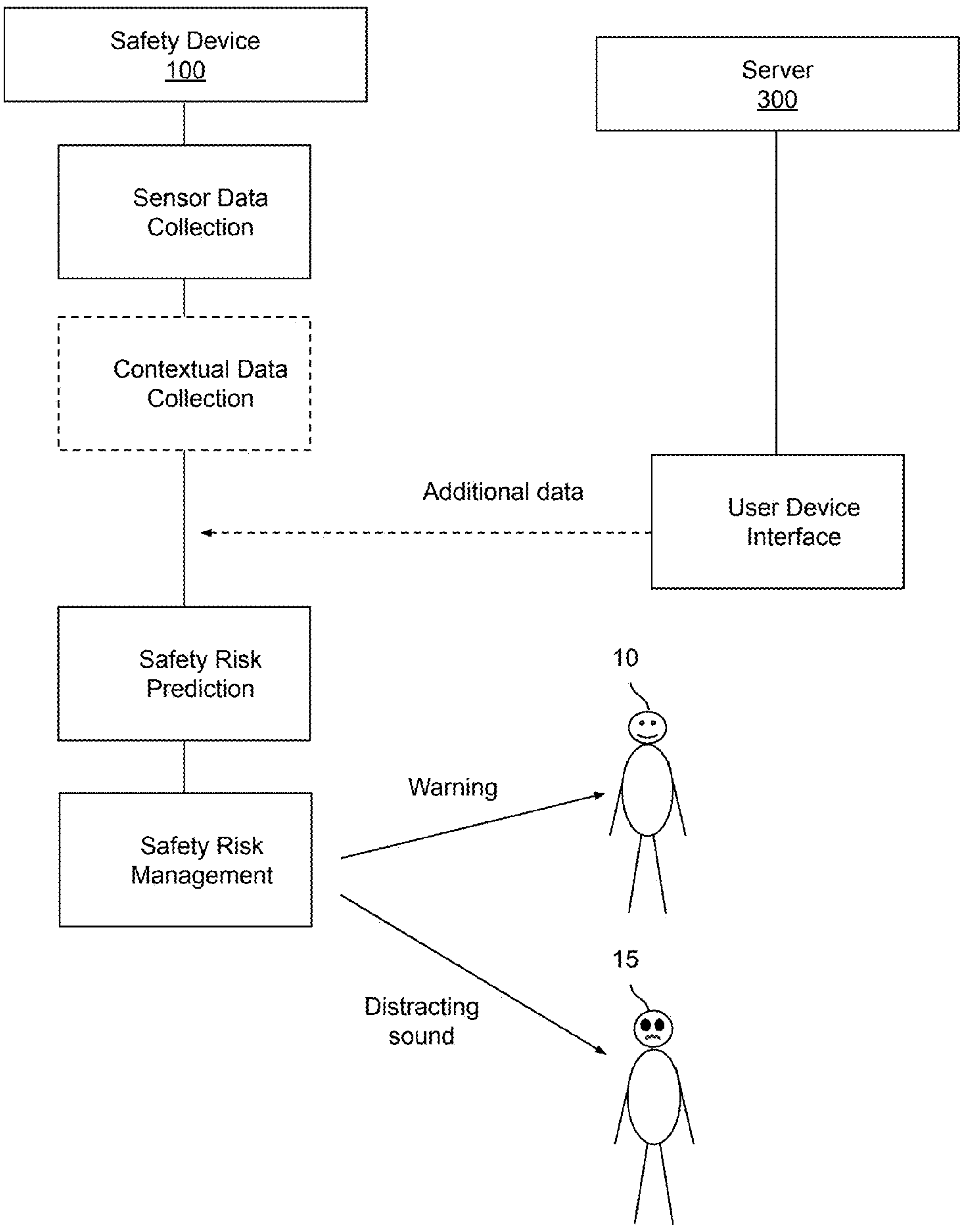

FIG. 10 illustrates a third use case where the safety device 100 executes the safety risk prediction functionality (step 415 of the method 400). If a safety risk is detected, the safety device 100 executes the client-side safety risk management functionality (step 420 of the method 400), which comprises taking an action directed to the user 10 (e.g. warn the user 10 of the safety risk) and/or taking an action directed to the person(s) 15 (e.g. generate a deterring sound sequence to deter the person(s) 15).

The action(s) taken by the client-side safety risk management functionality in this third use case may be combined with the sending of an alert described in the first and second use cases.

Figure 11:
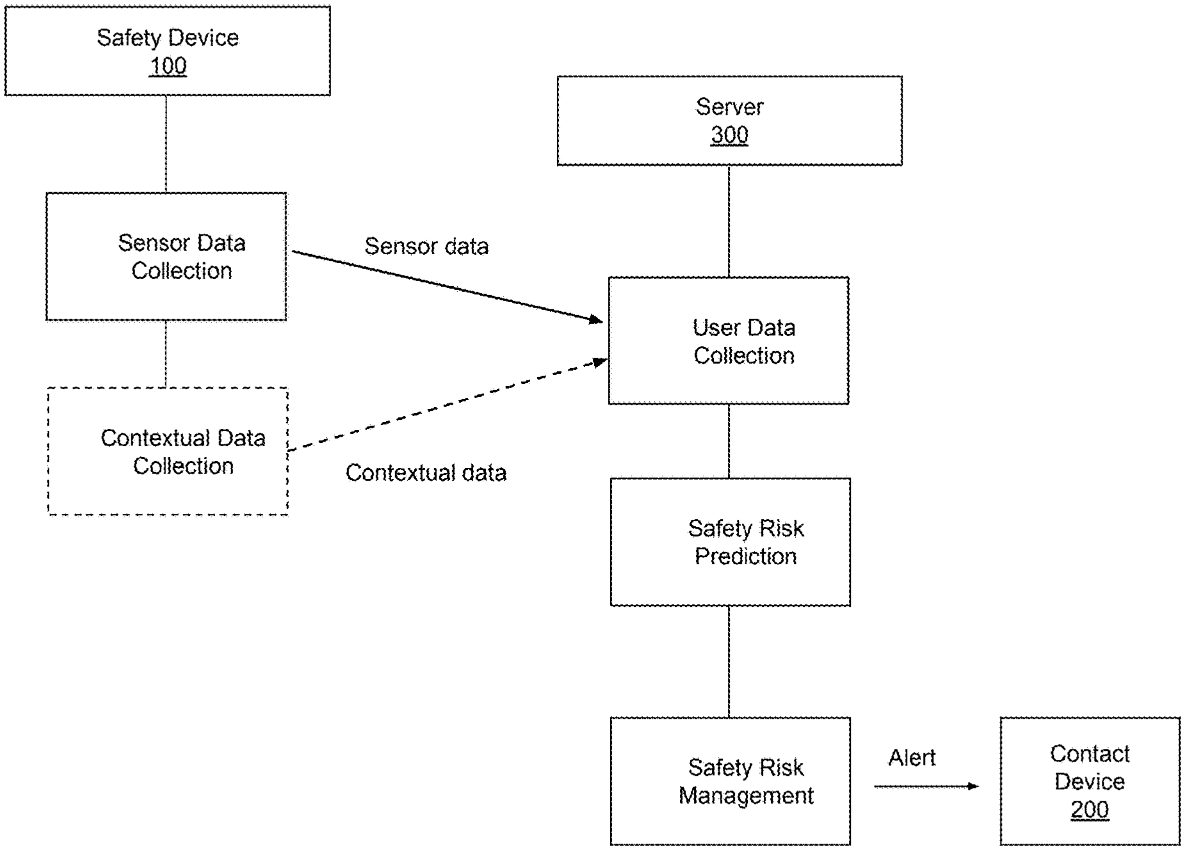

FIG. 11 illustrates a fourth use case where the safety device 100 transmits the sensor data to the server 300 (the sensor data are received and stored by the user data collection functionality of the safety device 100). Optionally, the safety device 100 also transmits contextual data to the server 300 (the contextual data are collected by the contextual data collection functionality of the safety device 100).

The server 300 executes the safety risk prediction functionality (step 515 of the method 500). If a safety risk is detected, the server 300 executes the server-side safety risk management functionality (step 520 of the method 500), which comprises sending an alert to one or more contact devices 200 (selected via the algorithm implemented by the server-side safety risk management functionality).

Figure 12:
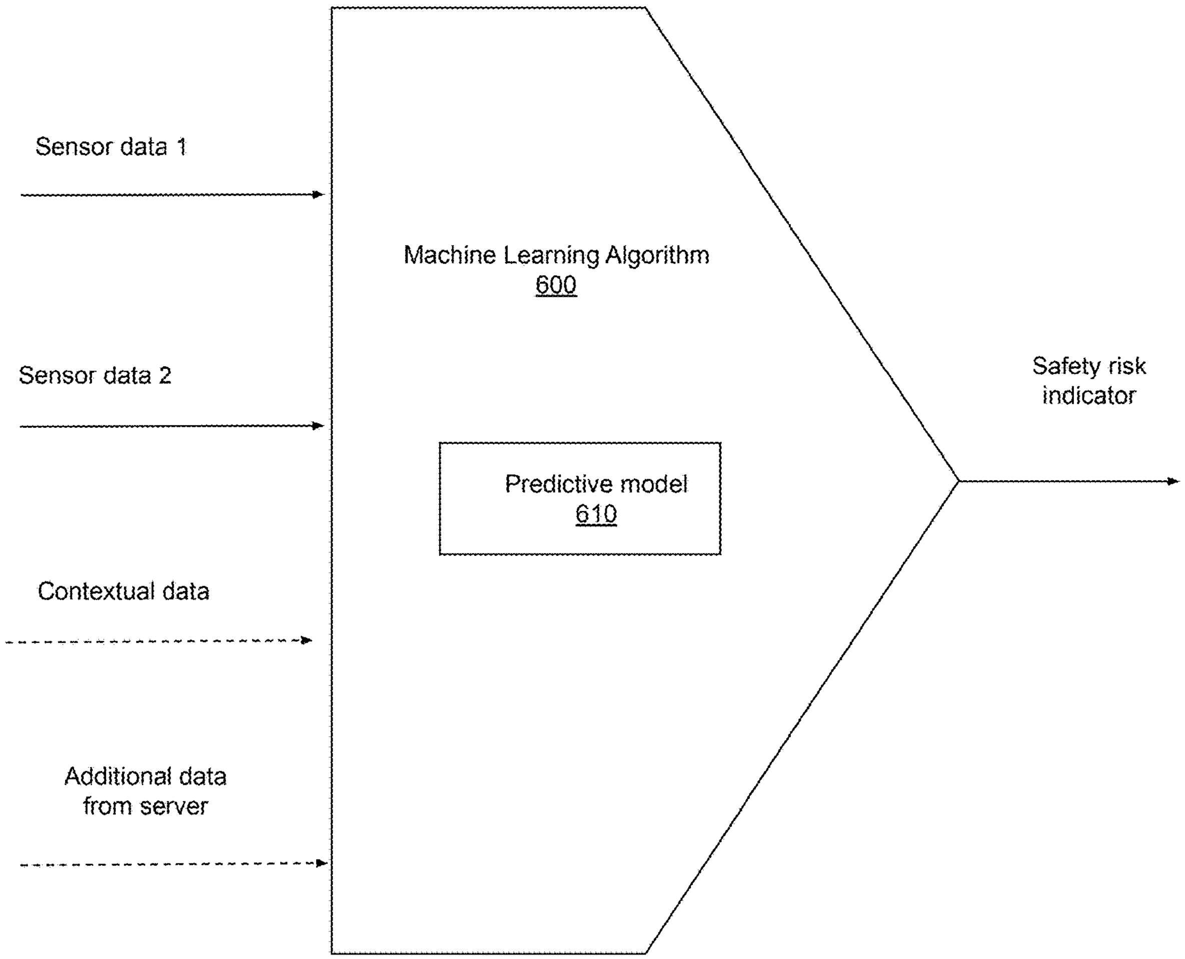
FIG. 12 represents an exemplary implementation of the safety risk prediction functionality illustrated in FIG. 4 by a machine learning algorithm.

Reference is now made concurrently to FIGS. 2, 3, 4, 12 and 13. FIG. 12 represents the implementation of the safety risk prediction functionality by a machine learning algorithm 600. The machine learning algorithm 600 uses a predictive model 610 for generating output(s) based on inputs.

For illustration purposes, we consider the implementation where the safety risk prediction functionality is executed on the safety device 100. A person skilled in the art will readily adapt the following to the implementation where the safety risk prediction functionality is executed on the server 300. Furthermore, a person skilled in the art will readily adapt the following to another previously described safety functionality being implemented by the machine learning algorithm 600 (by adapting the inputs and output(s) of the machine learning algorithm 600).

During an initial training phase, the predictive model 610 is generated by a training server (not represented in the Figures). The predictive model 610 is then transmitted to the safety device 100. The predictive model 610 is received via the wireless communication interface 130 and stored in the memory 120.

The processing unit 110 executes the machine learning algorithm 600, using the predictive model 610 for generating the output(s) based on the inputs.

In the case of the safety risk prediction functionality, the machine learning algorithm 600 generates one output: the safety risk indicator. The inputs comprise one or more types of sensor data collected from the sensor(s) 140. For illustration purposes only, FIG. 12 represents the machine learning algorithm 600 receiving two different types of sensor data (represented as sensor data 1 and sensor data 2 in FIG. 12). Optionally, the inputs include other data, such as contextual data collected by the contextual data collection functionality, additional data transmitted by the server 300, etc. More details about the inputs used for generating the safety risk indicator have been provided previously when describing the safety risk prediction functionality in relation to FIG. 4.

Figure 13:
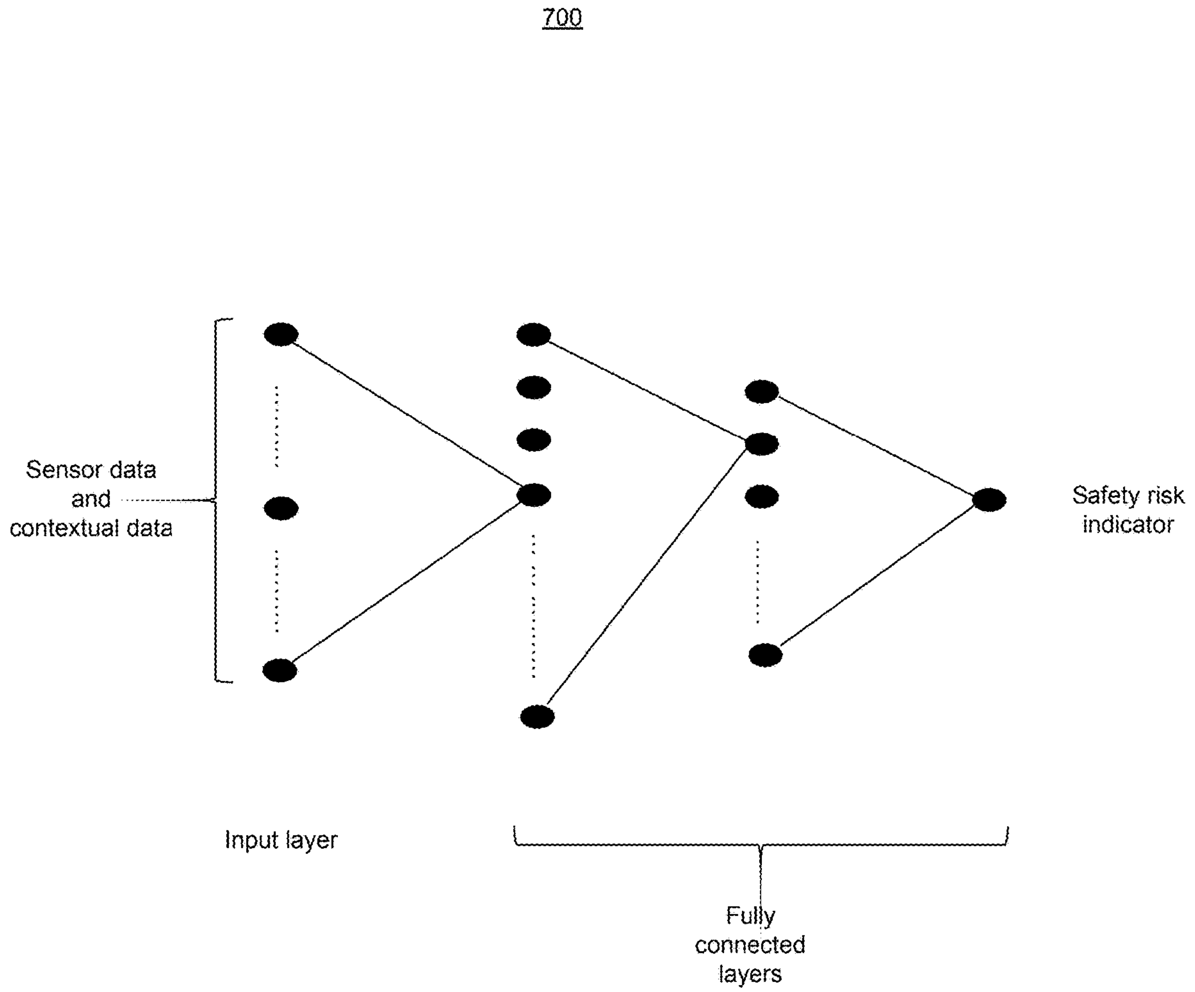
FIG. 13 represents a neural network implementing the machine learning algorithm illustrated in FIG. 12.

FIG. 13 represents an exemplary implementation of the machine learning algorithm 600 by a neural network 700.

The neural network 700 includes an input layer for receiving the inputs, followed by a plurality of fully connected layers. The last layer among the plurality of fully connected layers is an output layer for outputting the output(s). The output(s) are generated by the neural network 700, by applying the predictive model 610 to the inputs.

The neural network 700 represented in FIG. 13 is for illustration purposes only. A person skilled in the art will readily understand that other implementations of the neural network 700 may be used.

The output layer comprises one neuron for outputting the safety risk indicator. The input layer comprises neurons for receiving the sensor data and the contextual data (the data received by the input layer may vary from one implementation to another).

The operations of the fully connected layers are well known in the art. The number of fully connected layers is an integer greater than 2, including the output layer (FIG. 13 represents three fully connected layers, including the output layer, for illustration purposes only). The number of neurons in each fully connected layer may vary. During the training phase of the neural network, the number of fully connected layers and the number of neurons for each fully connected layer are selected; and may be adapted experimentally.

In an alternative implementation not represented in FIG. 13, the neural network 700 comprises a convolutional layer, optionally followed by a pooling layer, for receiving (instead of the input layer illustrated in FIG. 13) and processing at least some of the sensor data. The outputs of the convolutional layer and optional pooling layer are further processed by the fully connected layers. For example, the convolutional layer is used when some of the sensor data are in the form of a matrix (e.g. an image), which is processed by the convolutional layer.

Following is a description of a procedure for training the neural network 700 to generate the safety risk indicator. The training procedure is implemented by the aforementioned training server. The training procedure can be adapted by a person skilled in the art to other types of machine learning algorithms 600.

The training procedure comprises a step of initializing the predictive model 610. The initialization step comprises defining a number of layers of the neural network, a functionality for each layer (e.g. input layer, fully connected layer, etc.), initial values of parameters used for implementing the functionality of each layer, etc. For example, the initialization of the parameters of a fully connected layer includes determining the number of neurons of the fully connected layer and determining an initial value for the weights of each neuron. Different algorithms (well documented in the art) can be used for allocating an initial value to the weights of each neuron. A comprehensive description of the initialization of the predictive model is out of the scope of the present disclosure, since it is well known in the art.

The training procedure comprises a step of generating training data. The training data comprise a plurality of instances of inputs and a corresponding plurality of instances of expected output(s). In the configuration illustrated in FIG. 13, each instance of inputs consists of a set of values for the sensor data and contextual data. Each corresponding output consists of an expected value for the safety risk indicator. The set of training data needs to be large enough to properly train the neural network.

The training procedure comprises a step (I) of executing the neural network 700, using the predictive model 610 to generate respective instances of the calculated output based on the instances of inputs of the training data.

The training procedure comprises a step (II) of adjusting the predictive model 610 of the neural network 700, to minimize a difference between the instances of expected output and the corresponding instances of calculated output. For example, for a fully connected layer of the neural network, the adjustment comprises adjusting the weights associated to the neurons of the fully connected layer.

Various algorithms may be used for minimizing the difference between the expected output and the calculated output. For example, the predictive model is adjusted so that a difference between the expected output and the calculated output is lower than a threshold (e.g. a difference of only 1% is tolerated).

At the end of the training procedure, the neural network 700 is considered to be properly trained (the predictive model 610 of the neural network 700 has been adjusted so that a difference between the expected output and the calculated output has been sufficiently minimized). The predictive model 610, comprising the adjusted parameters of the neural network 700, is transmitted to the safety device 100. Test data are optionally used to validate the accuracy of the predictive model 610. The test data are different from the training data used for the training procedure.

Various techniques well known in the art of neural networks can be used for performing step (II). For example, the adjustment of the predictive model 610 of the neural network 700 at step (II) uses back propagation. Other techniques, such as the usage of bias in addition to the weights (bias and weights are generally collectively referred to as weights in the neural network terminology), reinforcement learning, supervised or unsupervised learning, etc., may also be used.

In an exemplary implementation, the training procedure is implemented by the server 300. The contextual data and sensor data collected by a plurality of safety devices 100 are transmitted to the server 300, aggregated and processed by the server 300, to generate (or improve) the predictive model 610. In this case, contextual data directly related to the users 10 (e.g. behavioral data of the users, gamified assessment of daily user experiences, etc.) are collected from the safety devices 100 and aggregated by the server 300. Contextual data not directly related to the users 10 (e.g. general safety information like crime rates, general purpose information like population demographics, etc.) are collected by the server 300 from relevant data sources.

Although the present disclosure focuses on the usage of a neural network, a person skilled in the art would readily understand that other machine learning technologies may be used in place of a neural network (e.g. linear regression, logistic regression, decision tree, support vector machine (SVM) algorithm, K-nearest neighbors algorithm, K-means algorithm, random forest algorithm, etc.). As is the case for neural networks, the predictive model used by a machine learning algorithm is generated during a training phase, using a training algorithm and training data.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for implementing personal safety functionalities, the method comprising:

collecting sensor data from at least one sensor of a device;

executing by a processing unit of the device a safety risk prediction algorithm, the algorithm using inputs comprising the sensor data to determine a safety risk indicator, the safety risk indicator being indicative of whether a user of the device is exposed to a safety risk presented by at least one person in the vicinity of the user of the device;

determining a global ranking for each of a plurality of contacts of the user based on data elements including at least one of a trust relationship, a response capacity, a proximity, or a response history of each contact;

displaying on a screen of the device a predictive community responder map based on a geolocation and the global ranking of each of the plurality of contacts; and taking at least one action by the processing unit of the device when the indicator indicates that the user is exposed to a safety risk.

2. The method of claim 1, wherein the sensor data comprise at least one of the following: visual behavioral changes of the at least one person extracted from images generated by an imaging sensor of the device, voice pattern changes of the at least one person extracted from sounds recorded by a sound sensor of the device, heart rate measurements of the user generated by a heart rate sensor of the device, and blood pressure measurements of the user generated by a blood pressure sensor of the device.

3. The method of claim 1, wherein the inputs further comprise at least one of the following: contextual data collected by the device and additional data received from a server implementing server-side personal safety functionalities.

4. The method of claim 1, wherein the action is at least one of the following: configurable and personalized based on contextual data collected by the device.

5. The method of claim 1, wherein the at least one action comprise at least one of the following: warning the user of the exposition to a safety risk through an interaction of the device with the user, generating a deterring sound sequence by a speaker of the device to deter the at least one person, sending an alert via a wireless communication interface of the device to a server in charge of forwarding the alert to one or more contact devices, and directly sending the alert via the wireless communication interface of the device to the one or more contact devices.

6. The method of claim 1, wherein the device is one of the following: a smartphone, a smart watch or a smart bangle.

7. The method of claim 1, wherein the algorithm is a machine learning algorithm using a predictive model for determining the safety risk indicator based on the inputs.

8. The method of claim 1, wherein the processing unit of the device determines a ranking and a localization of a plurality of contacts of the user, the ranking of each contact being based on at least one data element associated to the contact, the at least one data element associated to the contact comprising at least one of the following: a trust relationship of the contact, a response capacity of the contact, a proximity of the contact and a response history of the contact.

9. The method of claim 8, wherein a map based on the ranking and localization of the plurality of contacts of the user is displayed on a screen of the device.

10. The method of claim 8, wherein determining the ranking of the plurality of contacts of the user comprises calculating each ranking by the device based on data received from a server or receiving each ranking from the server.

11. A non-transitory computer readable medium comprising instructions executable by a processing unit of a device, the execution of the instructions by the processing unit of the device providing for implementing personal safety functionalities by:

collecting sensor data from at least one sensor of the device;

executing by the processing unit of the device a safety risk prediction algorithm, the algorithm using inputs comprising the sensor data to determine a safety risk indicator, the safety risk indicator being indicative of whether a user of the device is exposed to a safety risk presented by at least one person in the vicinity of the user of the device;

determining a global ranking for each of a plurality of contacts of the user based on data elements including at least one of a trust relationship, a response capacity, a proximity, or a response history of each contact;

causing display of a predictive community responder map on a screen of the device based on a geolocation and the global ranking of each of the plurality of contacts; and taking at least one action by the processing unit of the device when the indicator indicates that the user is exposed to a safety risk.

12. A safety device comprising:
a wireless communication interface;
at least one sensor;
a screen; and
a processing unit for:
collecting sensor data from the at least one sensor;
executing a safety risk prediction algorithm, the algorithm using inputs comprising the sensor data to determine a safety risk indicator, the safety risk indicator being indicative of whether a user of the safety device is exposed to a safety risk presented by at least one person in the vicinity of the user of the device;
determining a global ranking for each of a plurality of contacts of the user based on data elements including at least one of a trust relationship, a response capacity, a proximity, or a response history of each contact;
displaying on the screen a predictive community responder map based on a geolocation and the global ranking of each of the plurality of contacts; and
taking at least one action when the indicator indicates that the user is exposed to a safety risk.

13. The safety device of claim 12, wherein the sensor data comprise at least one of the following: visual behavioral changes of the at least one person extracted from images generated by an imaging sensor of the safety device, voice pattern changes of the at least one person extracted from sounds recorded by a sound sensor of the safety device, heart rate measurements of the user generated by a heart rate sensor of the safety device, and blood pressure measurements of the user generated by a blood pressure sensor of the device.

14. The safety device of claim 12, wherein the inputs further comprise at least one of the following: contextual data collected by the device and additional data received from a server implementing server-side personal safety functionalities.

15. The safety device of claim 12, wherein the at least one action comprise at least one of the following: warning the user of the exposition to a safety risk through an interaction of the safety device with the user, generating a deterring sound sequence by a speaker of the safety device to deter the at least one person, sending an alert via the wireless communication interface to a server in charge of forwarding the alert to one or more contact devices, and directly sending the alert via the wireless communication interface to the one or more contact devices.

16. The safety device of claim 12, wherein the safety device is one of the following: a smartphone, a smart watch or a smart bangle.

17. The safety device of claim 12, wherein the algorithm is a machine learning algorithm using a predictive model for determining the safety risk indicator based on the inputs.

18. The safety device of claim 12, wherein the processing unit of the device determines a ranking and a localization of a plurality of contacts of the user, the ranking of each contact being based on at least one data element associated to the contact, the at least one data element associated to the contact comprising at least one of the following: a trust relationship of the contact, a response capacity of the contact, a proximity of the contact and a response history of the contact.

19. The safety device of claim 18, wherein a map based on the ranking and localization of the plurality of contacts of the user is displayed on a screen of the device.

20. The safety device of claim 18, wherein determining the ranking of the plurality of contacts of the user comprises calculating each ranking by the device based on data received from a server or receiving each ranking from the server.

* * * * *